(12) United States Patent
Collins et al.

(10) Patent No.: US 11,054,148 B2
(45) Date of Patent: Jul. 6, 2021

(54) HEATED FLOOR AND CEILING PANEL WITH A CORRUGATED LAYER FOR MODULAR USE IN BUILDINGS

(71) Applicant: INNOVATIVE BUILDING TECHNOLOGIES, LLC, Seattle, WA (US)

(72) Inventors: Arlan Collins, Seattle, WA (US); Mark Woerman, Seattle, WA (US)

(73) Assignee: Innovative Building Technologies, LLC, Seattle, WA (US)

( * ) Notice: Subject to any disclaimer, the term of this patent is extended or adjusted under 35 U.S.C. 154(b) by 296 days.

(21) Appl. No.: 15/507,647

(22) PCT Filed: Aug. 28, 2015

(86) PCT No.: PCT/US2015/047383
§ 371 (c)(1),
(2) Date: Feb. 28, 2017

(87) PCT Pub. No.: WO2016/033429
PCT Pub. Date: Mar. 3, 2016

(65) Prior Publication Data
US 2017/0299198 A1    Oct. 19, 2017

Related U.S. Application Data

(60) Provisional application No. 62/044,193, filed on Aug. 30, 2014.

(51) Int. Cl.
*F24D 13/02*    (2006.01)
*F24D 3/14*     (2006.01)
(Continued)

(52) U.S. Cl.
CPC .......... *F24D 13/024* (2013.01); *E04B 1/7608* (2013.01); *E04B 1/8409* (2013.01);
(Continued)

(58) Field of Classification Search
CPC ............. F24D 3/14; E04C 2/521; E04C 2/525
(Continued)

(56) References Cited

U.S. PATENT DOCUMENTS 1,168,556 A    1/1916    Robinson et al.
1,501,288 A    7/1924    Morley
(Continued)

FOREIGN PATENT DOCUMENTS

AU    2005200682 B1    5/2005
AU    2012211472 A1    2/2014
(Continued)

OTHER PUBLICATIONS

US 8,701,371 B2, 04/2014, Collins et al. (withdrawn)
(Continued)

*Primary Examiner* — Christopher M Koehler
*Assistant Examiner* — Spencer H. Kirkwood
(74) *Attorney, Agent, or Firm* — IP Spring

(57) ABSTRACT

Floor and ceiling panels and methods of constructing a floor system for a building are described. In some embodiments, a panel includes a plurality of joists, a corrugated form deck disposed above and attached to the plurality of joists, a ceiling substrate disposed below and attached to the plurality of joists, and an in-floor radiant heat member disposed between the corrugated form deck and the ceiling substrate. In some embodiments, the panel includes a plurality of joists, a corrugated form deck disposed above and attached to the plurality of joists, and a sound dampener disposed between the corrugated form deck and the plurality of joists. In some embodiments, the method includes attaching a pre-assembled panel to a frame of the building and pouring concrete onto the panel so that a radiant heat member is separated from the concrete by a corrugated form deck of the panel.

20 Claims, 7 Drawing Sheets

(51) Int. Cl.
*E04B 5/48* (2006.01)
*E04B 5/02* (2006.01)
*E04C 2/52* (2006.01)
*E04B 1/76* (2006.01)
*E04B 1/84* (2006.01)
*H05B 3/28* (2006.01)
*E04B 1/74* (2006.01)

(52) U.S. Cl.
CPC .................. *E04B 5/48* (2013.01); *E04C 2/50* (2013.01); *E04C 2/521* (2013.01); *E04C 2/525* (2013.01); *F24D 3/142* (2013.01); *H05B 3/28* (2013.01); *E04B 1/74* (2013.01); *E04B 2001/747* (2013.01); *E04B 2001/8471* (2013.01); *F24D 3/148* (2013.01); *F24D 13/02* (2013.01); *Y02B 30/00* (2013.01)

(58) Field of Classification Search
USPC ....................................................... 219/213
See application file for complete search history.

(56) References Cited

U.S. PATENT DOCUMENTS

| | | |
|---|---|---|
| 1,876,528 A | 9/1932 | Walters |
| 1,883,376 A | 10/1932 | Meier et al. |
| 2,160,161 A | 5/1939 | Marsh |
| 2,419,319 A | 4/1947 | Lankton |
| 2,495,862 A | 1/1950 | Osborn |
| 2,562,050 A | 7/1951 | Lankton |
| 2,686,420 A | 8/1954 | Youtz |
| 2,722,724 A | 11/1955 | Miller |
| 2,758,467 A | 8/1956 | Brown et al. |
| 2,871,544 A | 2/1959 | Youtz |
| 2,871,997 A | 2/1959 | Simpson et al. |
| 2,877,990 A | 3/1959 | Goemann |
| 2,946,413 A | 7/1960 | Weismann |
| 3,017,723 A | 1/1962 | Von Heidenstam |
| 3,052,449 A | 9/1962 | Long et al. |
| 3,053,015 A | 9/1962 | Graham |
| 3,053,509 A | 9/1962 | Haupt et al. |
| 3,065,575 A | 11/1962 | Ray |
| 3,079,652 A | 3/1963 | Wahlfeld |
| 3,090,164 A | 5/1963 | Nels |
| 3,184,893 A | 5/1965 | Booth |
| 3,221,454 A | 12/1965 | Togni |
| 3,235,917 A | 2/1966 | Skubic |
| 3,236,014 A | 2/1966 | Edgar |
| 3,245,183 A | 4/1966 | Tessin, II |
| 3,281,172 A | 10/1966 | Kuehl |
| 3,315,424 A | 4/1967 | Smith |
| 3,324,615 A | 6/1967 | Zinn |
| 3,324,617 A | 6/1967 | Knight et al. |
| 3,355,853 A | 12/1967 | Wallace |
| 3,376,919 A | 4/1968 | Agostino |
| 3,388,512 A | 6/1968 | Newman |
| 3,392,497 A | 7/1968 | Cushman |
| 3,411,252 A | 11/1968 | Boyle, Jr. |
| 3,460,302 A | 8/1969 | Cooper |
| 3,469,873 A | 9/1969 | Glaros |
| 3,490,191 A | 1/1970 | Ekblom |
| 3,533,205 A | 10/1970 | Pestel et al. |
| 3,568,380 A | 3/1971 | Stucky et al. |
| 3,579,935 A | 5/1971 | Regan et al. |
| 3,590,393 A | 7/1971 | Hollander et al. |
| 3,594,965 A | 7/1971 | Saether |
| 3,601,937 A | 8/1971 | Campbell |
| 3,604,174 A | 9/1971 | Nelson, Jr. |
| 3,608,258 A | 9/1971 | Spratt |
| 3,614,803 A | 10/1971 | Matthews |
| 3,638,380 A | 2/1972 | Perri |
| 3,707,165 A | 12/1972 | Stahl |
| 3,713,265 A | 1/1973 | Wysocki et al. |
| 3,721,056 A | 3/1973 | Toan |
| 3,722,169 A | 3/1973 | Boehmig |
| 3,727,753 A | 4/1973 | Starr et al. |
| 3,742,666 A | 7/1973 | Antoniou |
| 3,750,366 A | 8/1973 | Rich, Jr. et al. |
| 3,751,864 A | 8/1973 | Berger et al. |
| 3,755,974 A | 9/1973 | Berman |
| 3,762,115 A | 10/1973 | McCaul, III et al. |
| 3,766,574 A | 10/1973 | Smid, Jr. |
| 3,821,818 A | 7/1974 | Alosi |
| 3,823,520 A | 7/1974 | Ohta et al. |
| 3,845,601 A | 11/1974 | Kostecky |
| 3,853,452 A | 12/1974 | Delmonte |
| 3,885,367 A | 5/1975 | Thunberg |
| 3,906,686 A | 9/1975 | Dillon |
| 3,921,362 A | 11/1975 | Ortega |
| 3,926,486 A | 12/1975 | Sasnett |
| 3,971,605 A | 7/1976 | Sasnett |
| 3,974,618 A | 8/1976 | Cortina |
| 3,990,202 A | 11/1976 | Becker |
| 4,018,020 A | 4/1977 | Sauer et al. |
| 4,038,796 A | 8/1977 | Eckel |
| 4,050,215 A | 9/1977 | Fisher |
| 4,059,936 A | 11/1977 | Lukens |
| 4,065,905 A | 1/1978 | Lely et al. |
| 4,078,345 A | 3/1978 | Piazzalunga |
| 4,107,886 A | 8/1978 | Ray et al. |
| 4,112,173 A | 9/1978 | Roudebush et al. |
| 4,114,335 A * | 9/1978 | Carroll ............... E04B 2/60 52/302.1 |
| 4,142,255 A | 3/1979 | Togni |
| 4,161,087 A | 7/1979 | Levesque |
| 4,170,858 A | 10/1979 | Walker |
| 4,171,545 A | 10/1979 | Kann |
| 4,176,504 A | 12/1979 | Huggins |
| 4,178,343 A | 12/1979 | Rojo, Jr. |
| 4,205,719 A * | 6/1980 | Norell ............... F24D 3/14 165/76 |
| 4,206,162 A | 6/1980 | Vanderklaauw |
| 4,214,413 A | 7/1980 | Gonzalez Espinosa de Los Monteros |
| 4,221,441 A | 9/1980 | Bain |
| 4,226,061 A | 10/1980 | Day, Jr. |
| 4,227,360 A | 10/1980 | Balinski |
| 4,248,020 A | 2/1981 | Zielinski et al. |
| 4,251,974 A | 2/1981 | Vanderklaauw |
| 4,280,307 A | 7/1981 | Griffin |
| 4,314,430 A | 2/1982 | Farrington |
| 4,325,205 A | 4/1982 | Salim et al. |
| 4,327,529 A | 5/1982 | Bigelow, Jr. et al. |
| 4,341,052 A | 7/1982 | Douglass, Jr. |
| 4,361,994 A | 12/1982 | Carver |
| 4,389,831 A | 6/1983 | Baumann |
| 4,397,127 A | 8/1983 | Mieyal |
| 4,435,927 A | 3/1984 | Umezu et al. |
| 4,441,286 A | 4/1984 | Skvaril |
| 4,447,987 A | 5/1984 | Lesosky |
| 4,447,996 A | 5/1984 | Maurer, Jr. et al. |
| 4,477,934 A | 10/1984 | Salminen |
| 4,507,901 A | 4/1985 | Carroll |
| 4,513,545 A | 4/1985 | Hopkins, Jr. |
| 4,528,793 A | 7/1985 | Johnson |
| 4,531,336 A | 7/1985 | Gartner |
| 4,592,175 A | 6/1986 | Werner |
| 4,646,495 A | 3/1987 | Chalik |
| 4,648,228 A | 3/1987 | Kiselewski |
| 4,655,011 A | 4/1987 | Borges |
| 4,688,750 A | 8/1987 | Teague et al. |
| 4,712,352 A | 12/1987 | Low |
| 4,757,663 A | 7/1988 | Kuhr |
| 4,813,193 A * | 3/1989 | Altizer ............... E04B 1/14 52/210 |
| 4,856,244 A | 8/1989 | Clapp |
| 4,862,663 A | 9/1989 | Krieger |
| 4,893,435 A | 1/1990 | Shalit |
| 4,910,932 A | 3/1990 | Honigman |
| 4,918,897 A | 4/1990 | Luedtke |
| 4,919,164 A | 4/1990 | Barenburg |
| 4,974,366 A | 12/1990 | Tizzoni |
| 4,991,368 A | 2/1991 | Amstutz |
| 5,009,043 A | 4/1991 | Kurrasch |

(56) References Cited

U.S. PATENT DOCUMENTS

| | | | |
|---|---|---|---|
| 5,010,690 A | 4/1991 | Geoffrey | |
| 5,036,638 A | 8/1991 | Kurtz, Jr. | |
| 5,076,310 A | 12/1991 | Barenburg | |
| 5,079,890 A | 1/1992 | Kubik et al. | |
| 5,127,203 A | 7/1992 | Paquette | |
| 5,127,760 A | 7/1992 | Brady | |
| 5,154,029 A | 10/1992 | Sturgeon | |
| 5,185,971 A | 2/1993 | Johnson, Jr. | |
| 5,205,091 A | 4/1993 | Brown | |
| 5,212,921 A | 5/1993 | Unruh | |
| 5,228,254 A | 7/1993 | Honeycutt, Jr. | |
| 5,233,810 A | 8/1993 | Jennings | |
| 5,254,203 A * | 10/1993 | Corston | B25B 27/0092 118/207 |
| 5,307,600 A | 5/1994 | Simon, Jr. et al. | |
| 5,359,816 A | 11/1994 | Iacouides | |
| 5,359,820 A | 11/1994 | McKay | |
| 5,361,556 A | 11/1994 | Menchetti | |
| 5,402,612 A | 4/1995 | diGirolamo et al. | |
| 5,412,913 A | 5/1995 | Daniels et al. | |
| 5,426,894 A | 6/1995 | Headrick | |
| 5,452,552 A | 9/1995 | Ting | |
| 5,459,966 A | 10/1995 | Suarez et al. | |
| 5,471,804 A | 12/1995 | Winter, IV | |
| 5,483,773 A | 1/1996 | Parisien | |
| 5,493,838 A | 2/1996 | Ross | |
| 5,509,242 A | 4/1996 | Rechsteiner et al. | |
| 5,519,971 A | 5/1996 | Ramirez | |
| 5,528,877 A | 6/1996 | Franklin | |
| 5,531,539 A | 7/1996 | Crawford | |
| 5,584,142 A | 12/1996 | Spiess | |
| 5,592,796 A | 1/1997 | Landers | |
| 5,593,115 A | 1/1997 | Lewis | |
| 5,611,173 A | 3/1997 | Headrick et al. | |
| 5,628,158 A | 5/1997 | Porter | |
| 5,640,824 A | 6/1997 | Johnson et al. | |
| 5,660,017 A | 8/1997 | Houghton | |
| 5,678,384 A | 10/1997 | Maze | |
| 5,697,189 A | 12/1997 | Miller et al. | |
| 5,699,643 A | 12/1997 | Kinard | |
| 5,706,607 A | 1/1998 | Frey | |
| 5,724,773 A | 3/1998 | Hall | |
| 5,735,100 A | 4/1998 | Campbell | |
| 5,743,330 A * | 4/1998 | Bilotta | F24D 3/141 165/183 |
| 5,746,034 A | 5/1998 | Luchetti et al. | |
| 5,755,982 A | 5/1998 | Strickland et al. | |
| 5,850,686 A | 12/1998 | Mertes | |
| 5,867,964 A | 2/1999 | Perrin | |
| 5,870,867 A | 2/1999 | Mitchell | |
| 5,921,041 A | 7/1999 | Egri, II | |
| 5,970,680 A | 10/1999 | Powers | |
| 5,987,841 A | 11/1999 | Campo | |
| 5,992,109 A | 11/1999 | Jonker | |
| 5,997,792 A | 12/1999 | Gordon | |
| 6,000,194 A | 12/1999 | Nakamura | |
| 6,055,787 A | 5/2000 | Gerhaher et al. | |
| 6,073,401 A | 6/2000 | Iri et al. | |
| 6,073,413 A | 6/2000 | Tongiatama | |
| 6,076,319 A | 6/2000 | Hendershot et al. | |
| 6,086,350 A | 7/2000 | Del Monte | |
| 6,128,877 A | 10/2000 | Goodman et al. | |
| 6,151,851 A | 11/2000 | Carter | |
| 6,154,774 A | 11/2000 | Furlong et al. | |
| 6,170,214 B1 | 1/2001 | Treister et al. | |
| 6,199,336 B1 | 3/2001 | Poliquin | |
| 6,240,704 B1 | 6/2001 | Porter | |
| 6,243,993 B1 | 6/2001 | Swensson | |
| 6,244,002 B1 | 6/2001 | Martin | |
| 6,244,008 B1 | 6/2001 | Miller | |
| 6,260,329 B1 | 7/2001 | Mills | |
| 6,289,646 B1 | 9/2001 | Watanabe | |
| 6,301,838 B1 | 10/2001 | Hall | |
| 6,308,465 B1 | 10/2001 | Galloway et al. | |
| 6,308,491 B1 | 10/2001 | Porter | |
| 6,340,508 B1 | 1/2002 | Frommelt et al. | |
| 6,371,188 B1 | 4/2002 | Baczuk et al. | |
| 6,393,774 B1 | 5/2002 | Fisher | |
| 6,421,968 B2 | 7/2002 | Degelsegger | |
| 6,427,407 B1 * | 8/2002 | Wilson | E04B 1/08 52/481.1 |
| 6,430,883 B1 | 8/2002 | Paz et al. | |
| 6,446,396 B1 | 9/2002 | Marangoni et al. | |
| 6,481,172 B1 | 11/2002 | Porter | |
| 6,484,460 B2 | 11/2002 | VanHaitsma | |
| 6,571,523 B2 | 6/2003 | Chambers | |
| 6,625,937 B1 | 9/2003 | Parker et al. | |
| 6,651,393 B2 | 11/2003 | Don et al. | |
| 6,688,056 B2 | 2/2004 | Von Hoyningen Huene et al. | |
| 6,729,094 B1 | 5/2004 | Spencer et al. | |
| 6,748,709 B1 | 6/2004 | Sherman et al. | |
| 6,807,790 B2 | 10/2004 | Strickland et al. | |
| 6,837,013 B2 | 1/2005 | Foderberg et al. | |
| 6,922,960 B2 | 8/2005 | Sataka | |
| 6,935,079 B1 | 8/2005 | Julian et al. | |
| 6,964,410 B1 | 11/2005 | Hansen | |
| 7,007,343 B2 | 3/2006 | Weiland et al. | |
| 7,059,017 B1 | 6/2006 | Rosko et al. | |
| 7,143,555 B2 | 12/2006 | Miller | |
| RE39,462 E | 1/2007 | Brady | |
| 7,389,620 B1 | 6/2008 | McManus | |
| 7,395,999 B2 | 7/2008 | Walpole | |
| 7,444,793 B2 | 11/2008 | Raftery et al. | |
| 7,467,469 B2 | 12/2008 | Wall | |
| 7,484,329 B2 | 2/2009 | Levy | |
| 7,484,339 B2 | 2/2009 | Fiehler | |
| 7,493,729 B1 | 2/2009 | Semmes | |
| 7,546,715 B2 | 6/2009 | Roen | |
| 7,574,837 B2 | 8/2009 | Hagen, Jr. et al. | |
| 7,640,702 B2 | 1/2010 | Termohlen | |
| 7,658,045 B2 | 2/2010 | Elliott et al. | |
| 7,676,998 B2 | 3/2010 | Lessard | |
| 7,694,462 B2 | 4/2010 | O'Callaghan et al. | |
| 7,721,491 B2 | 5/2010 | Appel | |
| 7,748,193 B2 | 7/2010 | Knigge et al. | |
| 7,908,810 B2 | 3/2011 | Payne, Jr. et al. | |
| 7,921,965 B1 | 4/2011 | Surace | |
| 7,941,985 B2 | 5/2011 | Simmons | |
| 7,966,778 B2 | 6/2011 | Klein | |
| 8,051,623 B2 | 11/2011 | Loyd | |
| D652,956 S | 1/2012 | Tanaka et al. | |
| 8,096,084 B2 | 1/2012 | Studebaker et al. | |
| 8,109,058 B2 | 2/2012 | Miller | |
| 8,127,507 B1 | 3/2012 | Bilge | |
| 8,166,716 B2 | 5/2012 | Macdonald et al. | |
| 8,234,827 B1 | 8/2012 | Schroeder, Sr. et al. | |
| 8,234,833 B2 | 8/2012 | Miller | |
| 8,251,175 B1 | 8/2012 | Englert et al. | |
| 8,276,328 B2 | 10/2012 | Pépin | |
| 8,322,086 B2 | 12/2012 | Weber | |
| 8,359,808 B2 | 1/2013 | Stephens, Jr. | |
| 8,424,251 B2 | 4/2013 | Tinianov | |
| 8,490,349 B2 | 7/2013 | Lutzner et al. | |
| 8,505,259 B1 | 8/2013 | Degtyarev | |
| 8,539,732 B2 | 9/2013 | Leahy | |
| 8,555,581 B2 | 10/2013 | Amend | |
| 8,555,589 B2 | 10/2013 | Semmens et al. | |
| 8,555,598 B2 | 10/2013 | Wagner et al. | |
| 8,621,806 B2 | 1/2014 | Studebaker et al. | |
| 8,621,818 B1 * | 1/2014 | Glenn | 52/745.13 |
| 8,631,616 B2 | 1/2014 | Carrion et al. | |
| 8,733,046 B2 | 5/2014 | Naidoo | |
| 8,769,891 B2 | 7/2014 | Kelly | |
| 8,826,613 B1 | 9/2014 | Chrien | |
| 8,833,025 B2 | 9/2014 | Krause | |
| 8,950,132 B2 | 2/2015 | Collins et al. | |
| 8,966,845 B2 | 3/2015 | Ciuperca | |
| 8,978,324 B2 | 3/2015 | Collins et al. | |
| 8,991,111 B1 | 3/2015 | Harkins | |
| 8,997,424 B1 | 4/2015 | Miller | |
| 9,027,307 B2 | 5/2015 | Collins et al. | |
| 9,382,709 B2 | 7/2016 | Collins et al. | |
| 9,637,911 B2 | 5/2017 | Doupe et al. | |
| 9,683,361 B2 | 6/2017 | Timberlake et al. | |

(56) References Cited

U.S. PATENT DOCUMENTS

| | | |
|---|---|---|
| 10,260,250 B2 | 4/2019 | Collins et al. |
| 10,273,686 B2 | 4/2019 | Lake |
| 10,323,428 B2 | 6/2019 | Collins et al. |
| 10,370,851 B2 | 8/2019 | Bodwell et al. |
| 10,501,929 B2 | 12/2019 | Henry |
| 10,731,330 B2 | 8/2020 | Petricca |
| 2002/0059763 A1 | 5/2002 | Wong |
| 2002/0092703 A1* | 7/2002 | Gelin ............... E04B 9/001 181/285 |
| 2002/0134036 A1 | 9/2002 | Daudet et al. |
| 2002/0184836 A1 | 12/2002 | Takeuchi et al. |
| 2003/0056445 A1 | 3/2003 | Cox |
| 2003/0084629 A1 | 5/2003 | Strickland et al. |
| 2003/0101680 A1 | 6/2003 | Lee |
| 2003/0140571 A1 | 7/2003 | Muha et al. |
| 2003/0167712 A1 | 9/2003 | Robertson |
| 2003/0167719 A1* | 9/2003 | Alderman ............ B32B 3/20 52/407.3 |
| 2003/0200706 A1 | 10/2003 | Kahan et al. |
| 2003/0221381 A1 | 12/2003 | Ting |
| 2004/0065036 A1 | 4/2004 | Capozzo |
| 2004/0103596 A1 | 6/2004 | Don et al. |
| 2004/0221518 A1 | 11/2004 | Westra |
| 2005/0081484 A1 | 4/2005 | Yland et al. |
| 2005/0108957 A1 | 5/2005 | Quesada |
| 2005/0188626 A1 | 9/2005 | Johnson |
| 2005/0188632 A1 | 9/2005 | Rosen |
| 2005/0198919 A1 | 9/2005 | Hester |
| 2005/0204697 A1 | 9/2005 | Rue |
| 2005/0204699 A1 | 9/2005 | Rue |
| 2005/0210764 A1 | 9/2005 | Foucher et al. |
| 2005/0210798 A1 | 9/2005 | Burg et al. |
| 2005/0235571 A1 | 10/2005 | Ewing et al. |
| 2005/0235581 A1 | 10/2005 | Cohen et al. |
| 2005/0262771 A1 | 12/2005 | Gorman |
| 2006/0021289 A1 | 2/2006 | Elmer |
| 2006/0070321 A1 | 4/2006 | Au |
| 2006/0090326 A1 | 5/2006 | Corbett |
| 2006/0096202 A1 | 5/2006 | DelZotto |
| 2006/0117689 A1 | 6/2006 | Onken et al. |
| 2006/0137293 A1 | 6/2006 | Klein |
| 2006/0143856 A1 | 7/2006 | Rosko et al. |
| 2006/0150521 A1 | 7/2006 | Henry et al. |
| 2006/0179764 A1 | 8/2006 | Ito |
| 2006/0248825 A1 | 11/2006 | Garringer |
| 2006/0277841 A1 | 12/2006 | Majusiak |
| 2007/0000198 A1 | 1/2007 | Payne, Jr. et al. |
| 2007/0074464 A1 | 4/2007 | Eldridge et al. |
| 2007/0107349 A1 | 5/2007 | Erker |
| 2007/0151196 A1* | 7/2007 | Boatwright ............ E04B 1/24 52/652.1 |
| 2007/0163197 A1 | 7/2007 | Payne et al. |
| 2007/0209306 A1 | 9/2007 | Andrews et al. |
| 2007/0234657 A1 | 10/2007 | Speyer et al. |
| 2007/0251168 A1 | 11/2007 | Turner |
| 2007/0283640 A1 | 12/2007 | Shivak et al. |
| 2007/0294954 A1 | 12/2007 | Barrett et al. |
| 2008/0000177 A1 | 1/2008 | Siu |
| 2008/0057290 A1 | 3/2008 | Guevara et al. |
| 2008/0092472 A1 | 4/2008 | Doerr et al. |
| 2008/0098676 A1 | 5/2008 | Hutchens |
| 2008/0099283 A1 | 5/2008 | Reigwein |
| 2008/0104901 A1 | 5/2008 | Olvera |
| 2008/0168741 A1 | 7/2008 | Gilgan et al. |
| 2008/0178542 A1 | 7/2008 | Williams |
| 2008/0178642 A1 | 7/2008 | Sanders |
| 2008/0190053 A1 | 8/2008 | Surowiecki |
| 2008/0202048 A1 | 8/2008 | Miller et al. |
| 2008/0222981 A1 | 9/2008 | De Gobbi |
| 2008/0229669 A1 | 9/2008 | Abdollahzadeh et al. |
| 2008/0245007 A1 | 9/2008 | McDonald |
| 2008/0279620 A1 | 11/2008 | Berg |
| 2008/0282626 A1 | 11/2008 | Powers, Jr. |
| 2008/0295443 A1 | 12/2008 | Simmons |
| 2008/0295450 A1 | 12/2008 | Yogev |
| 2009/0031652 A1 | 2/2009 | Ortega Gatalan |
| 2009/0038764 A1 | 2/2009 | Pilz |
| 2009/0064611 A1 | 3/2009 | Hall et al. |
| 2009/0077916 A1 | 3/2009 | Scuderi et al. |
| 2009/0090074 A1 | 4/2009 | Klein |
| 2009/0100760 A1 | 4/2009 | Ewing |
| 2009/0100769 A1 | 4/2009 | Barrett et al. |
| 2009/0100796 A1 | 4/2009 | Denn et al. |
| 2009/0107065 A1* | 4/2009 | LeBlang ............ E04B 1/80 52/252 |
| 2009/0113820 A1 | 5/2009 | Deans |
| 2009/0134287 A1 | 5/2009 | Klosowski |
| 2009/0165399 A1 | 7/2009 | Campos Gines |
| 2009/0188192 A1 | 7/2009 | Studebaker et al. |
| 2009/0188193 A1 | 7/2009 | Studebaker et al. |
| 2009/0205277 A1 | 8/2009 | Gibson |
| 2009/0249714 A1 | 10/2009 | Combs et al. |
| 2009/0277122 A1 | 11/2009 | Howery et al. |
| 2009/0282766 A1 | 11/2009 | Roen |
| 2009/0283359 A1 | 11/2009 | Ravnaas |
| 2009/0293395 A1 | 12/2009 | Porter |
| 2009/0313931 A1 | 12/2009 | Porter |
| 2010/0050556 A1 | 3/2010 | Burns |
| 2010/0058686 A1 | 3/2010 | Henriquez |
| 2010/0064590 A1 | 3/2010 | Jones et al. |
| 2010/0064601 A1 | 3/2010 | Napier |
| 2010/0146874 A1 | 6/2010 | Brown |
| 2010/0146893 A1 | 6/2010 | Dickinson |
| 2010/0186313 A1 | 7/2010 | Stanford et al. |
| 2010/0212255 A1 | 8/2010 | Lesoine |
| 2010/0218443 A1 | 9/2010 | Studebaker et al. |
| 2010/0229472 A1 | 9/2010 | Malpas |
| 2010/0235206 A1 | 9/2010 | Miller et al. |
| 2010/0263308 A1 | 10/2010 | Olvera |
| 2010/0275544 A1 | 11/2010 | Studebaker et al. |
| 2010/0313518 A1 | 12/2010 | Berg |
| 2010/0325989 A1 | 12/2010 | Leahy |
| 2011/0041411 A1 | 2/2011 | Aragon |
| 2011/0056147 A1 | 3/2011 | Beaudet |
| 2011/0113709 A1 | 5/2011 | Pilz et al. |
| 2011/0113715 A1 | 5/2011 | Tonyan et al. |
| 2011/0126484 A1 | 6/2011 | Carrion et al. |
| 2011/0146180 A1 | 6/2011 | Klein et al. |
| 2011/0154766 A1 | 6/2011 | Kralic et al. |
| 2011/0162167 A1 | 7/2011 | Blais |
| 2011/0219720 A1 | 9/2011 | Strickland et al. |
| 2011/0247281 A1 | 10/2011 | Pilz et al. |
| 2011/0268916 A1 | 11/2011 | Pardue, Jr. |
| 2011/0296769 A1 | 12/2011 | Collins et al. |
| 2011/0296778 A1 | 12/2011 | Collins et al. |
| 2011/0296789 A1 | 12/2011 | Collins et al. |
| 2011/0300386 A1 | 12/2011 | Pardue, Jr. |
| 2012/0073227 A1 | 3/2012 | Urusoglu |
| 2012/0096800 A1 | 4/2012 | Berg |
| 2012/0137610 A1 | 6/2012 | Knight et al. |
| 2012/0151869 A1 | 6/2012 | Miller |
| 2012/0167505 A1 | 7/2012 | Krause |
| 2012/0186174 A1 | 7/2012 | LeBlang |
| 2012/0210658 A1 | 8/2012 | Logan |
| 2012/0291378 A1 | 11/2012 | Schroeder et al. |
| 2012/0297712 A1 | 11/2012 | Lutzner et al. |
| 2012/0317923 A1 | 12/2012 | Herdt et al. |
| 2013/0025222 A1 | 1/2013 | Mueller |
| 2013/0025966 A1 | 1/2013 | Nam et al. |
| 2013/0036688 A1 | 2/2013 | Gosain |
| 2013/0067832 A1 | 3/2013 | Collins et al. |
| 2013/0111840 A1 | 5/2013 | Bordener |
| 2013/0133277 A1 | 5/2013 | Lewis |
| 2013/0232887 A1 | 9/2013 | Donnini |
| 2014/0013678 A1 | 1/2014 | Deverini |
| 2014/0013684 A1 | 1/2014 | Kelly et al. |
| 2014/0013695 A1 | 1/2014 | Wolynski et al. |
| 2014/0047780 A1 | 2/2014 | Quinn et al. |
| 2014/0059960 A1 | 3/2014 | Cole |
| 2014/0069035 A1 | 3/2014 | Collins |
| 2014/0069040 A1 | 3/2014 | Gibson |
| 2014/0069050 A1 | 3/2014 | Bolin |
| 2014/0083046 A1 | 3/2014 | Yang |
| 2014/0090323 A1 | 4/2014 | Glancy |

(56) References Cited

U.S. PATENT DOCUMENTS

| | | | |
|---|---|---|---|
| 2014/0130441 A1 | 5/2014 | Sugihara et al. | |
| 2014/0317841 A1 | 10/2014 | Dejesus et al. | |
| 2014/0338280 A1 | 11/2014 | Tanaka et al. | |
| 2015/0007415 A1 | 1/2015 | Kalinowski | |
| 2015/0093184 A1 | 4/2015 | Henry | |
| 2015/0096251 A1 | 4/2015 | McCandless et al. | |
| 2015/0121797 A1 | 5/2015 | Brown et al. | |
| 2015/0128518 A1 | 5/2015 | Knight et al. | |
| 2015/0136361 A1* | 5/2015 | Gregory ............... | F24D 3/146 165/104.19 |
| 2015/0152634 A1 | 6/2015 | Unger | |
| 2015/0233108 A1 | 8/2015 | Eggleston, II et al. | |
| 2015/0252558 A1 | 9/2015 | Chin | |
| 2015/0284950 A1 | 10/2015 | Stramandinoli | |
| 2015/0297926 A1 | 10/2015 | Dzegan | |
| 2015/0308096 A1 | 10/2015 | Merhi et al. | |
| 2016/0002912 A1 | 1/2016 | Doupe et al. | |
| 2016/0053475 A1 | 2/2016 | Locker et al. | |
| 2016/0122996 A1 | 5/2016 | Timberlake et al. | |
| 2016/0145933 A1 | 5/2016 | Condon et al. | |
| 2016/0258160 A1 | 9/2016 | Radhouane et al. | |
| 2016/0290030 A1 | 10/2016 | Collins et al. | |
| 2016/0319534 A1 | 11/2016 | Bernardo | |
| 2017/0037613 A1 | 2/2017 | Collins et al. | |
| 2017/0284095 A1 | 10/2017 | Collins et al. | |
| 2017/0299198 A1 | 10/2017 | Collins et al. | |
| 2017/0306624 A1 | 10/2017 | Graham et al. | |
| 2017/0306625 A1 | 10/2017 | Collins et al. | |
| 2017/0342735 A1 | 11/2017 | Collins et al. | |
| 2018/0038103 A1 | 2/2018 | Neumayr | |
| 2018/0148926 A1 | 5/2018 | Lake | |
| 2018/0209136 A1 | 7/2018 | Aylward et al. | |
| 2018/0223521 A1 | 8/2018 | Uno et al. | |
| 2018/0328056 A1 | 11/2018 | Collins et al. | |
| 2019/0032327 A1 | 3/2019 | Musson | |
| 2019/0119908 A1 | 4/2019 | Petricca | |
| 2019/0136508 A1 | 5/2019 | Chaillan | |
| 2019/0249409 A1 | 8/2019 | Boyd et al. | |
| 2020/0224407 A1 | 7/2020 | Ng | |

FOREIGN PATENT DOCUMENTS

| | | | |
|---|---|---|---|
| CN | 1313921 | 9/2001 | |
| CN | 1234087 | 11/2002 | |
| CN | 1742144 | 3/2006 | |
| CN | 201037279 Y | 3/2008 | |
| CN | 101426986 | 5/2009 | |
| CN | 101821462 | 9/2010 | |
| CN | 101831963 | 9/2010 | |
| CN | 102105642 | 6/2011 | |
| CN | 201952944 | 8/2011 | |
| CN | 202117202 | 1/2012 | |
| CN | 102459775 | 5/2012 | |
| CN | 102587693 A | 7/2012 | |
| CN | 202299241 U | 7/2012 | |
| CN | 202391078 | 8/2012 | |
| CN | 102733511 A | 10/2012 | |
| CN | 205024886 | 2/2016 | |
| CN | 206070835 | 4/2017 | |
| CN | 108487464 | 9/2018 | |
| DE | 4205812 | 9/1993 | |
| DE | 9419429 | 2/1995 | |
| DE | 20002775 | 8/2000 | |
| DE | 19918153 | 11/2000 | |
| DE | 20315506 | 11/2004 | |
| DE | 202008007139 | 10/2009 | |
| EP | 0612896 | 8/1994 | |
| EP | 1045078 A2 | 10/2000 | |
| EP | 1375804 A2 | 1/2004 | |
| EP | 1568828 A1 * | 8/2005 | ............ E04C 2/525 |
| EP | 2128353 A1 | 12/2009 | |
| EP | 2213808 | 8/2010 | |
| EP | 2238872 A2 | 10/2010 | |
| EP | 1739246 B1 | 1/2011 | |
| EP | 2281964 A1 | 2/2011 | |
| EP | 3133220 | 2/2017 | |
| FR | 1317681 | 5/1963 | |
| FR | 2988749 A1 | 10/2013 | |
| FR | 2765906 | 1/2019 | |
| GB | 898905 A | 6/1962 | |
| GB | 2481126 | 12/2011 | |
| JP | S46-006980 | 12/1971 | |
| JP | S49-104111 | 9/1974 | |
| JP | S5215934 Y2 | 4/1977 | |
| JP | S53000014 Y2 | 1/1978 | |
| JP | 53-156364 | 12/1978 | |
| JP | S5484112 U | 6/1979 | |
| JP | S54-145910 | 11/1979 | |
| JP | 56-131749 | 10/1981 | |
| JP | S57158451 A | 9/1982 | |
| JP | S59-065126 | 5/1984 | |
| JP | S60-019606 | 2/1985 | |
| JP | 61-144151 | 9/1986 | |
| JP | S61-201407 | 12/1986 | |
| JP | S6358035 | 3/1988 | |
| JP | H01-153013 | 10/1989 | |
| JP | H0310985 A | 1/1991 | |
| JP | H049373 Y2 | 3/1992 | |
| JP | 6-12178 | 2/1994 | |
| JP | 06-212721 | 8/1994 | |
| JP | H06-220932 | 8/1994 | |
| JP | H07-173893 | 7/1995 | |
| JP | H0752887 Y2 | 12/1995 | |
| JP | 8-189078 | 7/1996 | |
| JP | H08-189078 | 7/1996 | |
| JP | 2576409 B2 | 1/1997 | |
| JP | H09-228510 | 9/1997 | |
| JP | 10234493 A | 9/1998 | |
| JP | H10245918 A | 9/1998 | |
| JP | 11-117429 | 4/1999 | |
| JP | H11-100926 | 4/1999 | |
| JP | 2000-34801 | 2/2000 | |
| JP | 2000144997 A | 5/2000 | |
| JP | 2000-160861 | 6/2000 | |
| JP | 3137760 B2 | 2/2001 | |
| JP | 3257111 | 2/2002 | |
| JP | 2002-309691 | 10/2002 | |
| JP | 2002536615 | 10/2002 | |
| JP | 2002364104 A | 12/2002 | |
| JP | 2003-505624 | 2/2003 | |
| JP | 2003-278300 | 10/2003 | |
| JP | 2003-293493 | 10/2003 | |
| JP | 2003278300 | 10/2003 | |
| JP | 2004108031 | 4/2004 | |
| JP | 2004-344194 | 12/2004 | |
| JP | 3664280 | 6/2005 | |
| JP | 2006-161406 | 6/2006 | |
| JP | 3940621 | 7/2007 | |
| JP | 2008-063753 | 3/2008 | |
| JP | 2008073434 A | 4/2008 | |
| JP | 2008110104 A | 5/2008 | |
| JP | 2009-257713 | 11/2009 | |
| JP | 2010-185264 | 8/2010 | |
| JP | 2010185264 | 8/2010 | |
| JP | 2011032802 | 2/2011 | |
| JP | 3187449 | 11/2013 | |
| JP | 2015-117502 | 6/2015 | |
| KR | 1019990052255 | 7/1999 | |
| KR | 1019990053902 | 7/1999 | |
| KR | 100236196 | 12/1999 | |
| KR | 102000200413000 | 10/2000 | |
| KR | 20060066931 A | 6/2006 | |
| KR | 20080003326 | 8/2008 | |
| KR | 101481790 | 1/2015 | |
| KR | 20180092677 | 8/2018 | |
| WO | 9107557 | 5/1991 | |
| WO | 9722770 A1 | 6/1997 | |
| WO | 235029 A1 | 5/2000 | |
| WO | 200046457 | 8/2000 | |
| WO | 0058583 A1 | 10/2000 | |
| WO | 2002035029 | 5/2002 | |
| WO | 2006091864 | 8/2006 | |
| WO | 2007059003 A2 | 5/2007 | |

(56) References Cited

FOREIGN PATENT DOCUMENTS

| WO | 2007080561 | | 7/2007 |
|---|---|---|---|
| WO | 2008/113207 | | 9/2008 |
| WO | 2010030060 | A1 | 3/2010 |
| WO | 2010037938 | A2 | 4/2010 |
| WO | 2011015681 | | 2/2011 |
| WO | 2011/116622 | | 9/2011 |
| WO | 2015050502 | | 4/2015 |
| WO | 2016032537 | | 3/2016 |
| WO | 2016032537 | A1 | 3/2016 |
| WO | 2016032538 | A1 | 3/2016 |
| WO | 2016032539 | A1 | 3/2016 |
| WO | 2016032540 | A1 | 3/2016 |
| WO | 2016033429 | | 3/2016 |
| WO | 2016033429 | A1 | 3/2016 |
| WO | 2016033525 | A1 | 3/2016 |

OTHER PUBLICATIONS

Extended European Search Report for European Patent Application No. 14900469 dated Mar. 20, 2018, pp. 8.
Non-Final Office Action in U.S. Appl. No. 151507,654 dated Apr. 11, 2018, 67 pages.
Extended European Search Report for European Patent Application No. 15836516.3 dated Jun. 22, 2018, pp. 5.
"Beam to column connection," TATA Steel, accessed at https://web.archive.org/web/20140706075634/http://www.tatasteelconstruction.com/en/reference/teaching_resources/architectural_studio_reference/elements/connections/beam_to_column_connections, accessed on Mar. 1, 2017, pp. 3.
"Emerging Trends in real estate," Urban Land Institute, accessed at https://web.archive.org/web/20140813084823/http://pwc.com.au/industry/real-estate/assets/Real-Estate-2012-Europe-Jan12.pdf, pp. 60 (2012).
"FC EW 1—12mm Fibre Cement Sheet+ 9mm MgO Board Wall Assembly", FRAMECAD, pp. 2 (2013).
"How to Soundproof a Ceiling—Soundproofing Ceilings," accessed at https://web.archive.org/web/20140829130523/http://www.soundproofingcompany.com/soundproofing-solutions/soundproof-a-ceiling, accessed on Mar. 1, 2017, pp. 7.
"Structural Insulated Panel," Wikipedia, accessed at https://web.archive.org/web/20131207165431/http://en.wikipedia.org/wiki/Structural_insulated_panel, last modified on Nov. 20, 2013, pp. 3.
"Structural Insulated Panels," Whole Building Design Guide, accessed at https://web.archive.org/web/20140828133136/http://www.wbdg.org/resources/sips.php, accessed on Mar. 1, 2017, pp. 8.
Azari, R., et al., "Modular Prefabricated Residential Construction—Constraints and Opportunities", PNCCRE Technical Report #TR002, pp. 90 (Aug. 2013).
Borzouie, J., and Mahdizadeh, A., "Seismic Assessment and Rehabilitation of Diaphragms—Technical report," pp. 1-86 (2011).
European Search Report for Patent Application No. 14891125.8, dated Jul. 8, 2016, pp. 4.
Giles, H. and Lara, F., "Innovations in the Development of Industrially Designed and Manufactured Modular Concepts for Low-Energy, Multi-story, High-Density, Prefabricated Affordable Housing," accessed at http://sitemaker.umich.edu/path-nsf giles/files/giles_and_lara_final.pdf, accessed on Jun. 16, 2015, pp. 1-15.
Gonchar, J., "Paradigm Shift," accessed at https://web.archive.org/web/20130326 1544/14/http://continuingeducation.construction.com/article.php?L=5&C=943&P=2, Posted on Oct. 2012, pp. 2.
Insulspan Installation Guide, Installation Guide, pp. 58 (Apr. 25, 2008).
International Search Report and Written opinion for International Application No. PCT/US/2014/053613 dated Dec. 18, 2014, pp. 13.
International Search Report and Written opinion for International Application No. PCT/US/2014/053614 dated Dec. 18, 2014, pp. 11.
International Search Report and Written opinion for International Application No. PCT/US/2014/053615 date Dec. 17, 2014, pp. 11.
International Search Report and Written opinion for International Application No. PCT/US/2014/053616 dated Dec. 17, 2014, pp. 9.
International Search Report and Written opinion for International Application No. PCT/US15/47536 dated Dec. 4, 2015, pp. 17.
International Search Report and Written Opinion for International Application No. PCT/US2011/001039 dated Oct. 5, 2011, pp. 14.
International Search Report and Written opinion for International Application No. PCT/US2015/047383 dated Jan. 12, 2016, pp. 14.
Kerin, J. and Nadji, H., "National Apartment Report—2013",pp. 1-62 (2013).
Mcilwain, J., "Housing in America—The Next Decade," Urban Land Institute, pp. 36 (2010).
Mcilwain, J., "The Rental Boost From Green Design," Urban Land, accessed at http://urbanland.uli.org/sustainability/the-rental-boost-from-green-design/, Jan. 4, 2012, pp. 7.
Riusillo, M.A., "Lift Slab Construction: Its History, Methodology, Economics, and Applications," International Concrete Abstracts Portal, Special Publication, vol. 107, pp. 59-68 (Jun. 1, 1988).
"Shashaty, A., "Housing Demand," Sustainable Communities, pp. 3 (Mar./Apr. 2011)".
Sichelman, L., "NAHB/Orlando: Severe Apartment Shortage Looms," accessed at http://urbanland.uli.org/capital-markets/nahb-orlando-severe-apartment-shortage-looms/, Urban Land, Jan. 13, 2011, pp. 2.
Stiemer, S F., "Bolted Beam-Column Connections (Design and Cost Estimation)," Steel Design, pp. 1-16 (Nov. 11, 2007).
EPO, Communication Pursuant to Article 94(3) EPC mailed for European patent application No. 14900469.9, dated Jun. 18, 2019, 5 pages.
EPO, Communication Pursuant to Article 94(3) EPC mailed for EP application No. 15836516.3, dated Apr. 25, 2019, 4 pages.
WIPO, International Search Report for International Patent Application No. PCT/US2017/021174, dated Jun. 26, 2017, 11 pages.
WIPO, Written Opinion for International Patent Application No. PCT/US2017/021174, dated Jun. 26, 2017, 6 pages.
WIPO, International Search Report of International Patent Application No. PCT/US2017/021177, dated Jun. 5, 2017, 8 pages.
WIPO, Written Opinion of International Patent Application No. PCT/US2017/021177, dated Jun. 5, 2017, 8 pages.
WIPO, International Search Report for International Patent Application No. PCT/US2017/021168, dated May 19, 2017, 5 pages.
WIPO, Written Opinion for International Patent Application No. PCT/US2017/021168, dated May 19, 2017, 8 pages.
WIPO, International Search Report for International Patent Application No. PCT/US2017/021179, dated May 25, 2017, 7 pages.
WIPO, Written Opinion for International Patent Application No. PCT/US2017/021179, dated May 25, 2017, 7 pages.
WIPO, International Search Report and Written Opinion mailed for International application No. PCT/US2014/053614 dated Dec. 18, 2014, 11 pages.
WIPO, International Search Report and Written Opinion mailed for International application No. PCT/US2014/053615 dated Dec. 17, 2014, 11 Pages.
WIPO, International Search Report and Written Opinion mailed for International application No. PCT/US2014/053613 dated Dec. 18, 2014, 13 pages.
WIPO, International Search Report and Written Opinion mailed for International application No. PCT/US2015/047536 dated Dec. 4, 2015, 17 Pages.
WIPO, International Search Report and Written Opinion mailed for International application No. PCT/US2014/053616 dated Dec. 17, 2014, 9 Pages.
EPO, Extended European Search Report for European Patent Application No. 17763910.1, dated Jan. 28, 2020, 13 pages.
EPO, Communication Pursuant to Article 94(3) EPC for European Patent Application No. 15836516.3, dated Aug. 2, 2019, 4 pages.
EPO, Extended European Search Report for European Patent Application No. 17763914.3, dated Nov. 19, 2019, 10 pages.
EPO, Extended European Search Report for European Patent Application No. 17763913.5, dated Oct. 16, 2019, 8 pages.
EPO, Partial European Search Report for European Patent Application No. 17763910.1, dated Oct. 17, 2019, 16 pages.

(56) References Cited

OTHER PUBLICATIONS

EPO, Extended European Search Report for European Patent Application No. 17763907.7, dated Sep. 13, 2019, 13 pages.
IPO of Singapore, Written Opinion for Singapore Patent Application No. 11201807218S, dated Nov. 8, 2019, 6 pages.
IPOS, Written Opinion for Singapore Patent Application No. 11201807196R, dated Nov. 18, 2019, 12 pages.
WIPO, International Search Report and Written Opinion mailed for International application No. PCT/US2019/031370, dated Aug. 7, 2019, 11 pages.
WIPO, "International Search Report and Written Opinion for PCT Application No. PCT/US2019/038557", dated Sep. 4, 2019, 67 pages.
EPO, Extended European Search Report for European Patent Application No. 20201601.0, dated Mar. 16, 2021, 10 pages.

* cited by examiner

HEATED FLOOR AND CEILING PANEL WITH A CORRUGATED LAYER FOR MODULAR USE IN BUILDINGS

CROSS-REFERENCE TO RELATED APPLICATIONS

The present application is a U.S. National Stage filing under 35 U.S.C. § 371 of International Application No. PCT/US2015/047383, filed on Aug. 28, 2015, which claims priority as a non-provisional application under 35 U.S.C. § 119(e) to U.S. Provisional Application No. 62/044,193, filed on Aug. 30, 2014, entitled "FLOOR AND CEILING PANEL FOR USE IN BUILDINGS." U.S. Provisional Application No. 62/044,193 is incorporated herein by reference in its entirety.

BACKGROUND

Conventional construction is conducted in the field at the building job site. People in various trades (e.g., carpenters, electricians, and plumbers) measure, cut, and install material as though each unit were one-of-a-kind. Furthermore, activities performed by the trades are arranged in a linear sequence. The result is a time-consuming process that increases the risk of waste, installation imperfections, and cost overruns.

The industry's response to improving efficiency has historically been modular construction. In the case of buildings with multiple dwelling units (e.g., apartments, hotels, student dorms, etc.), entire dwelling units (referred to as modules) are built off-site in a factory and then trucked to the job site. The modules are then stacked and connected together, generally resulting in a low-rise construction (e.g., between one and six stories).

SUMMARY

Techniques are generally described that include systems and methods. An example system may include a pre-assembled floor and ceiling panel for use in buildings. The panel may include a plurality of joists, a corrugated form deck disposed above and attached to the plurality of joists, a ceiling substrate disposed below and attached to the plurality of joists, and an in-floor radiant heat member disposed between the corrugated form deck and the ceiling substrate.

In some embodiments, the panel may include a sound dampener disposed between the corrugated form deck and the plurality of joists.

In some embodiments, the panel may include a sound dampener disposed between the ceiling substrate and the plurality of joists.

In some embodiments, one or more joists of the plurality of joists may define a plurality of apertures extending transversely through the one or more joists.

In some embodiments, the in-floor radiant heat member extends through one or more apertures of the plurality of apertures of the one or more joists.

In some embodiments, the panel may include thermal insulation disposed between the corrugated form deck and the ceiling substrate. In some embodiments, the panel may include a layer of material disposed below the corrugated form deck. The layer of material may cover one or more flutes of the corrugated form deck to restrict migration of the thermal insulation into the one or more flutes. The layer of material may be thermally conductive. The in-floor radiant heat member may be attached to the layer of material.

In some embodiments, the panel may include plumbing, sprinkler piping, or electrical wiring disposed in a cavity defined between the thermal insulation and the ceiling substrate.

In some embodiments, the in-floor radiant heat member may be heat piping.

In some embodiments, the in-floor radiant heat member may be an electrical heating element.

In some embodiments, the panel may include a floor material disposed above the corrugated form deck. In some embodiments, the floor material may be concrete.

An example system may include a panel for use in a building. The panel may include a plurality of joists, a corrugated form deck disposed above and attached to the plurality of joists, and a sound dampener disposed between the corrugated form deck and the plurality of joists.

In some embodiments, the sound dampener may include a plurality of strips of material aligned with the plurality of joists.

In some embodiments, the panel may include a ceiling substrate positioned below and attached to the plurality of joists, and a sound dampener disposed between the ceiling substrate and the plurality of joists. The panel may include a radiant heat member disposed between the corrugated form deck and the ceiling substrate. The panel may include thermal insulation disposed between the corrugated form deck and the ceiling substrate.

In some embodiments, the panel may include a thermally-conductive material abutted against a lower surface of the corrugated form deck. The thermally-conductive material may span across multiple flutes of the corrugated form deck. A radiant heat member may be disposed below and attached to the thermally-conductive material.

An example method may include a method of constructing a floor system for a building. The method may include attaching a pre-assembled panel to a frame of a building, wherein the pre-assembled panel comprises a plurality of joists, a corrugated form deck disposed above and attached to the plurality of joists, a ceiling substrate disposed below and attached to the plurality of joists, and a radiant heat member disposed between the corrugated form deck and the ceiling substrate. The method may further include pouring concrete onto the corrugated form deck. The radiant heat member may be separated from the concrete by the corrugated form deck.

In some embodiments, the method may include attaching a second pre-assembled panel to a frame of a building, wherein the panel comprises a plurality of joists, a corrugated form deck disposed above and attached to the plurality of joists, a ceiling substrate disposed below and attached to the plurality of joists, and a radiant heat pipe disposed between the corrugated form deck and the ceiling substrate. In some embodiments, the method may include attaching the pre-assembled panels together with a strip of material to cover a seam between the panels.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
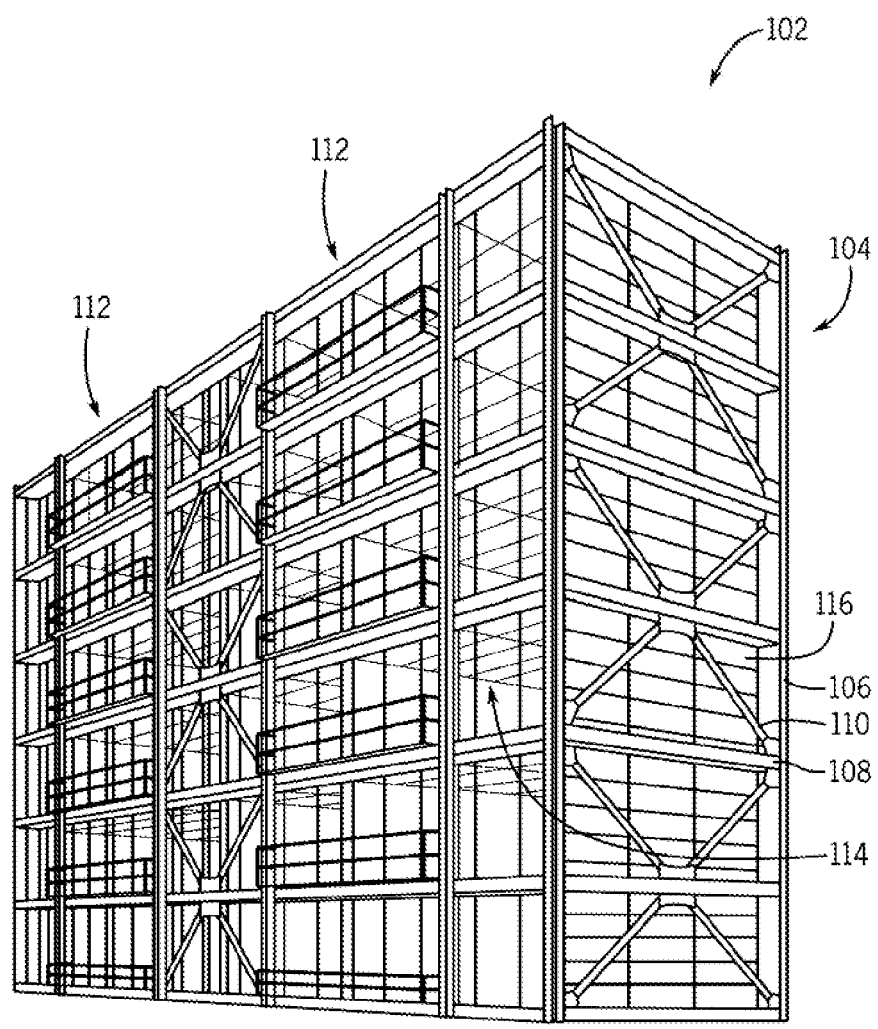
FIG. 1 is a schematic illustration of an example multi-story building.

all arranged in accordance with at least some embodiments of the present disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, products, devices, and/or apparatus generally related to a panel for use in a building. The panel may be assembled off-site in a shop and then transported to the building site. At the building site, the panel may be attached directly or indirectly to a building frame. The panel may define part of or the whole of a floor and part of or the whole of a ceiling in the building. The floor may be a portion of a story of the building above the panel, and the ceiling may be a portion of a story of the building below the panel.

The panel may include a frame, a floor substrate, and a ceiling substrate. The frame may separate the floor substrate and the ceiling substrate apart from one another in a vertical direction. The frame may include a plurality of joists positioned between the floor substrate and the ceiling substrate. The frame may define one or more joist cavities between adjacent joists. The one or more joist cavities may accommodate an in-floor radiant heat member, plumbing, cabling, wiring, or other elements that may support dwelling or commercial units in the buildings. An insulative material may be located between the heat member and the ceiling substrate to reduce heat transmission from the heat member to the story below the panel. Sound dampener material may be positioned between the frame, the floor substrate, and the ceiling substrate to reduce sound transmission through the panel.

The floor substrate may be attached to an upper side of the frame. The floor substrate may support a floor material of an upper story. The floor substrate may be formed of a corrugated form deck or other floor substrate capable of supporting a floor material. In some embodiments, the floor substrate may support a concrete floor to define a finished floor of the upper story.

The ceiling substrate may be attached to a lower side of the frame. The ceiling substrate may support a ceiling material of a lower story. The ceiling substrate may be formed of a fiber cement board or other ceiling substrate capable of supporting a ceiling material. In some embodiments, the ceiling substrate may support one or more acoustical panels to define a finished ceiling of the lower story.

In some embodiments, the material composition of the floor and ceiling panel may be predominantly metal. In some embodiments it may be predominately aluminum. In still other embodiments, the panel components may be made from a variety of building suitable materials ranging from metals, to wood and wood polymer composites (WPC), wood based products (lignin), other organic building materials (bamboo) to organic polymers (plastics), to hybrid materials, or earthen materials such as ceramics. In some embodiments cement or other pourable or moldable building materials may also be used. In other embodiments, any combination of suitable building material may be combined by using one building material for some elements of the panel and other building materials for other elements of the panel. Selection of any material may be made from a reference of material options (such as those provided for in the International Building Code), or selected based on the knowledge of those of ordinary skill in the art when determining load bearing requirements for the structures to be built. Larger and/or taller structures may have greater physical strength requirements than smaller and/or shorter buildings. Adjustments in building materials to accommodate size of structure, load and environmental stresses can determine optimal economical choices of building materials used for all components in the system described herein. Availability of various building materials in different parts of the world may also affect selection of materials for building the panel described herein. Adoption of the International Building Code or similar code may also affect choice of materials.

Any reference herein to "metal" includes any construction grade metals or metal alloys as may be suitable for fabrication and/or construction of the system and components described herein. Any reference to "wood" includes wood, wood laminated products, wood pressed products, wood polymer composites (WPCs), bamboo or bamboo related products, lignin products and any plant derived product, whether chemically treated, refined, processed or simply harvested from a plant. Any reference herein to "concrete" includes any construction grade curable composite that includes cement, water, and a granular aggregate. Granular aggregates may include sand, gravel, polymers, ash and/or other minerals.

In some embodiments, the panel may include a plurality of joists, a corrugated form deck disposed above and attached to the plurality of joists, a ceiling substrate disposed below and attached to the plurality of joists, and an in-floor radiant heat member disposed between the corrugated form deck and the ceiling substrate. The panel may be prefabricated off-site and transported to a building site for installation into a structural frame of a building. In some embodiments, when the panel is installed, the corrugated form deck may provide support for a floor material for a portion of a story of a building above the panel and the ceiling substrate may provide a ceiling for a portion of a story below the panel.

In referring now to the drawings, repeating units of the same kind or generally fungible kind, are designated by the part number and a letter (e.g. 214n), where the letters "a", "b" and so on refer to a discrete number of the repeating items. General reference to the part number followed by the letter "n" indicates there is no predetermined or established limit to the number of items intended. The parts are listed as "a-n" referring to starting at "a" and ending at any desired number "n".

FIG. 1 illustrates a schematic illustration of an example multi-story building 102, arranged in accordance with at least some embodiments described herein. The building 102 may include two or more stories or levels. The building 102 may include a corresponding number of stories to be classified as a low-rise, mid-rise, or high-rise construction (each city or zoning authority may define building heights in any fashion they deem proper). The floor-ceiling panel as described herein may be suitable for use in a building of any number of stories (levels). In FIG. 1, the building 102 includes six stories. In some embodiments, the building may be a residential multi-dwelling building having eight or more stories.

The building 102 may include a structural, external frame 104. The external frame 104 may serve as a structural exoskeleton of the building 102. The external frame 104 may include multiple columns 106, beams 108, and cross braces 110. The columns 106 may be oriented vertically, the beams 108 may be oriented horizontally, and the cross braces 110 may be oriented obliquely to the columns 106 and the beams 108. The beams 108 may extend between and be attached to adjacent columns 106 to connect the adjacent columns 106 to one another. The cross braces 110 may extend between and be attached to contiguous beams 108 and columns 106 to provide additional stiffness to the external frame 104. In various embodiments described herein, the external frame 104 may provide the structural support for the building 102. In some embodiments described herein, interior (demising) walls forming units or modules may not be load bearing walls. In some embodiments, the load bearing support may be provided by the external frame 104. The columns, beans and cross braces may be arranged to provide strictly structural support. The frame may be used to provide decoration or added support to the structure (not shown) as well.

The building 102 may include multiple units or modules 112 disposed internally of the external frame 104. The units 112 may be commercial, residential (such as dwelling units), or both. The units 112 may be assembled at the building site using multiple prefabricated components. The prefabricated components may be assembled independent of one another remotely from the building site and transported to the building site for installation. The components may be attached to the external frame 104, to adjacent components, or both at the building site to form the individual units 112. In some embodiments, the building 102 may include internal support structures. Prefabricated components may be attached to the internal support structures in some embodiments. Each story or level of the building 102 may include one or multiple units 112 defined by the prefabricated components. The units may be standardized and repetitive, or unique and individualized. Mixed units of standard size and shape may be combined with unique units in the same floor, or in independent arrangement on separate floors. In some embodiments, a unit may encompass more than one floor.

The components may include one or more pre-assembled floor and ceiling panels 114 and one or more walls 116. The floor and ceiling panels 114 may be oriented horizontally and may define the floor of an upper unit and the ceiling of a lower unit. Individual panels of the floor and ceiling panels 114 may be attached to adjacent floor and ceiling panels 114, columns 106, beams 108, or any combination thereof. The walls 116 may be oriented vertically and may partition each story into multiple units, a single unit into multiple rooms, or both. The walls 116 may be attached to the floor and ceiling panels 114 with fasteners and then caulked, sealed, or both.

Figure 2:
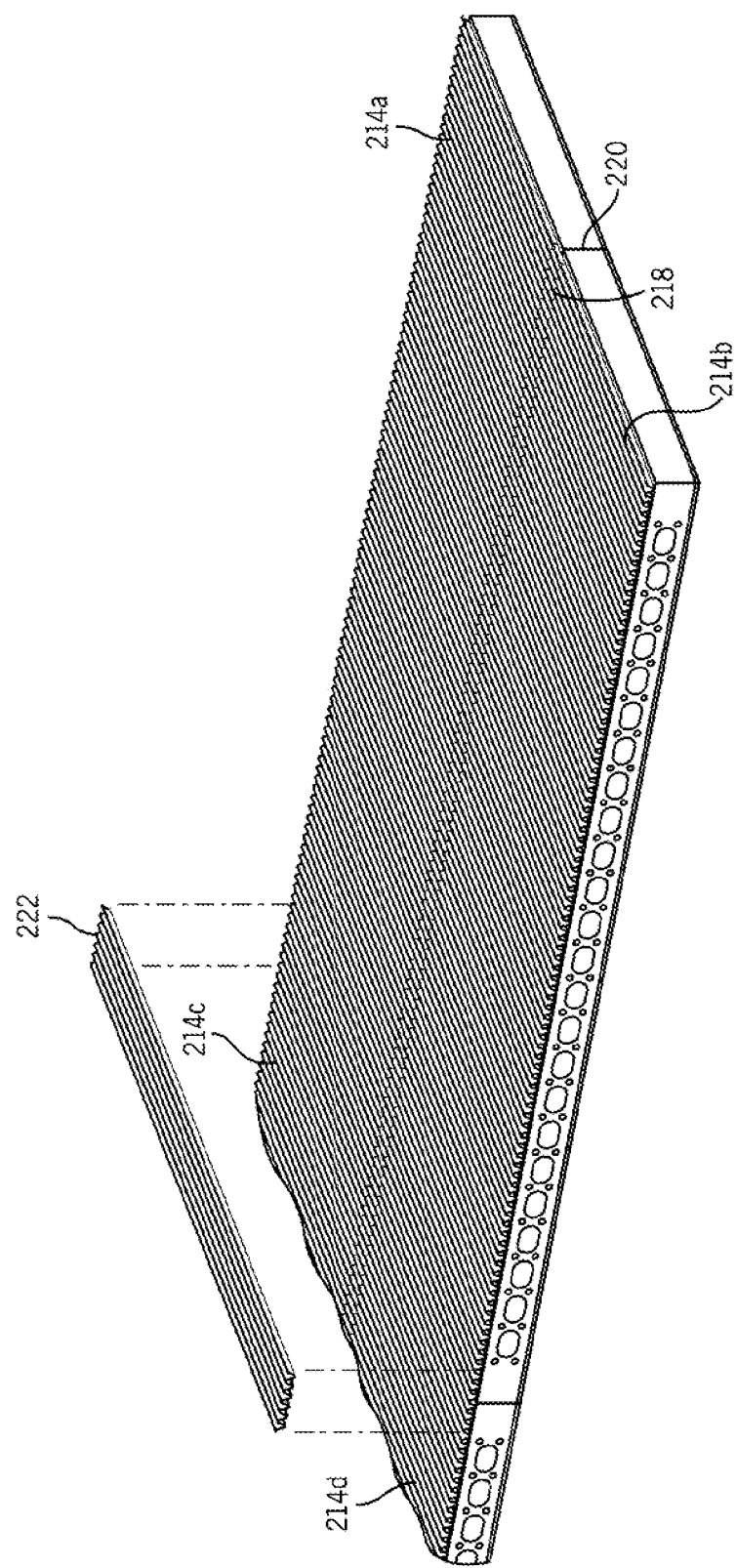
FIG. 2 is a schematic illustration of example floor and ceiling panels of the building of FIG. 1.

FIG. 2 illustrates a schematic illustration of example floor and ceiling panels, arranged in accordance with at least some embodiments described herein. FIG. 2 shows four floor and ceiling panels 214a, 214b, 214c, 214d positioned adjacent and attached to one another. The floor portion of the panels is facing up and substantially covers the ceiling portion of the panel in the view shown in FIG. 2. The floor and ceiling panels 214a, 214b, 214c, 214d may be positioned side-by-side or end-to-end and attached together by one or more lap pieces. The various components shown in FIG. 2 are merely embodiments, and other variations, including eliminating components, combining components, and substituting components are all contemplated. The panels 214n may be provided in any configuration (e.g., end to end, side to side, in non-repeating forms where there may be gaps between panels, and other configurations such as "L" shapes, "U" shapes, "O" shapes, etc.), and in any number.

Adjacent floor and ceiling panels 214a, 214b may be attached together in a side-by-side relationship by a first lap piece 218. The lap piece 218 may be formed of a strip of corrugated form deck extending longitudinally along a seam 220 formed between abutting sides of the panels 214n. The strip of corrugated form deck 218 may extend laterally from the seam 220 in opposing directions and overlap an upper surface of the adjacent floor and ceiling panels 214a, 214b. In some embodiments, the strip of corrugated form deck 218 may extend further to overlap an upper surface of the adjacent floor and ceiling panels 214c, 214d. In some embodiments, a second strip of corrugated form deck may be used to overlap an upper surface of the adjacent floor and ceiling panels 214c, 214d. The strip of corrugated form deck 218 may be attached to the adjacent floor and ceiling panels 214a, 214b to maintain the location of the panels 214a, 214b relative to one another. The strip of corrugated form deck 218 may have a deck flute pattern matching a flute pattern of the adjacent floor and ceiling panels 214a, 214b. In some embodiments, the strip of corrugated form deck 218 may overlap one or more flutes of each panel 214a, 214b. The corrugated form deck 218 may securely attach the adjacent panels 214a, 214b together, restrict ingress of concrete into the seam 220 during formation of a concrete topping slab at the building site, or both. In some embodiments, the strip of corrugated form deck 218 may have a width of between about two inches and about twenty-four inches. In some embodiments, the strip of corrugated form deck 218 may have a width of about six inches. The strip of corrugated form deck 218 may be formed of metal, such as aluminum or steel, or a non-metallic material, such as plastic. In some embodiments, the strip of corrugated form deck 218 may be formed of galvanized steel. In some embodiments, the strip of corrugated form deck 218 may be manufactured from G90 galvanized steel. In some embodiments, the strip of corrugated form deck 218 may have a thickness between about 20 gauge and about 26 gauge. In some embodiments, the strip of corrugated form deck 218 may be manufactured by Verco Decking, Inc. (marketed under the name Deep VERCOR™).

Adjacent floor and ceiling panels 214a, 214c and 214b, 214d may be attached together in an end-to-end relationship by a second lap piece 222. The second lap piece 222 may be oriented generally perpendicular (e.g., plus or minus fifteen degrees) to the first lap piece 218. The lap piece 222 may be formed of a strip of corrugated form deck 222 extending along a seam formed between abutting ends of the panels 214a, 214c and 214b, 214d. The overlap of the strip of corrugated form deck 218 extending along the sides of adjacent panels 214a, 214b may be different than the overlap of the strips of corrugated form deck 222 extending along the ends of the adjacent panels 214a, 214c and 214b, 214d. For example, the overlap of the strip of corrugated form deck 222 extending along the ends of the adjacent panels 214n may be greater than the overlap of the strip of corrugated form deck 218 extending along the sides of the adjacent panels 214a, 214b. In some embodiments, the overlap of the strip of corrugated form deck 222 may be about nine inches and the overlap of the strip of corrugated form deck 218 may be about three inches. In some embodiments, the strip of corrugated form deck 222 may have a width of about two inches to about twenty-four inches. In some embodiments, the strip of corrugated form deck 222 may have a width of about eighteen inches. The strip of corrugated form deck 222 may be formed of metal, such as aluminum or steel, or a non-metallic material, such as plastic. In some embodiments, the strip of corrugated form deck 222 may be formed of galvanized steel. In some embodiments, the strip of corrugated form deck 222 may be manufactured from G90 galvanized steel. In some embodiments, the strip of corrugated form deck 222 may have a thickness between about 20 gauge and about 26 gauge. In some embodiments, the strip of corrugated form deck 222 may be manufactured by Verco Decking, Inc. (marketed under the name Deep VERCOR™). As shown in FIG. 2, the floor and ceiling panel 214n may be rectangular in shape. In some embodiments, the floor and ceiling panel 214n may be non-rectangular in shape, such as triangular in shape (e.g., pie shaped), or configured in other shapes based on the building application.

Figure 3:
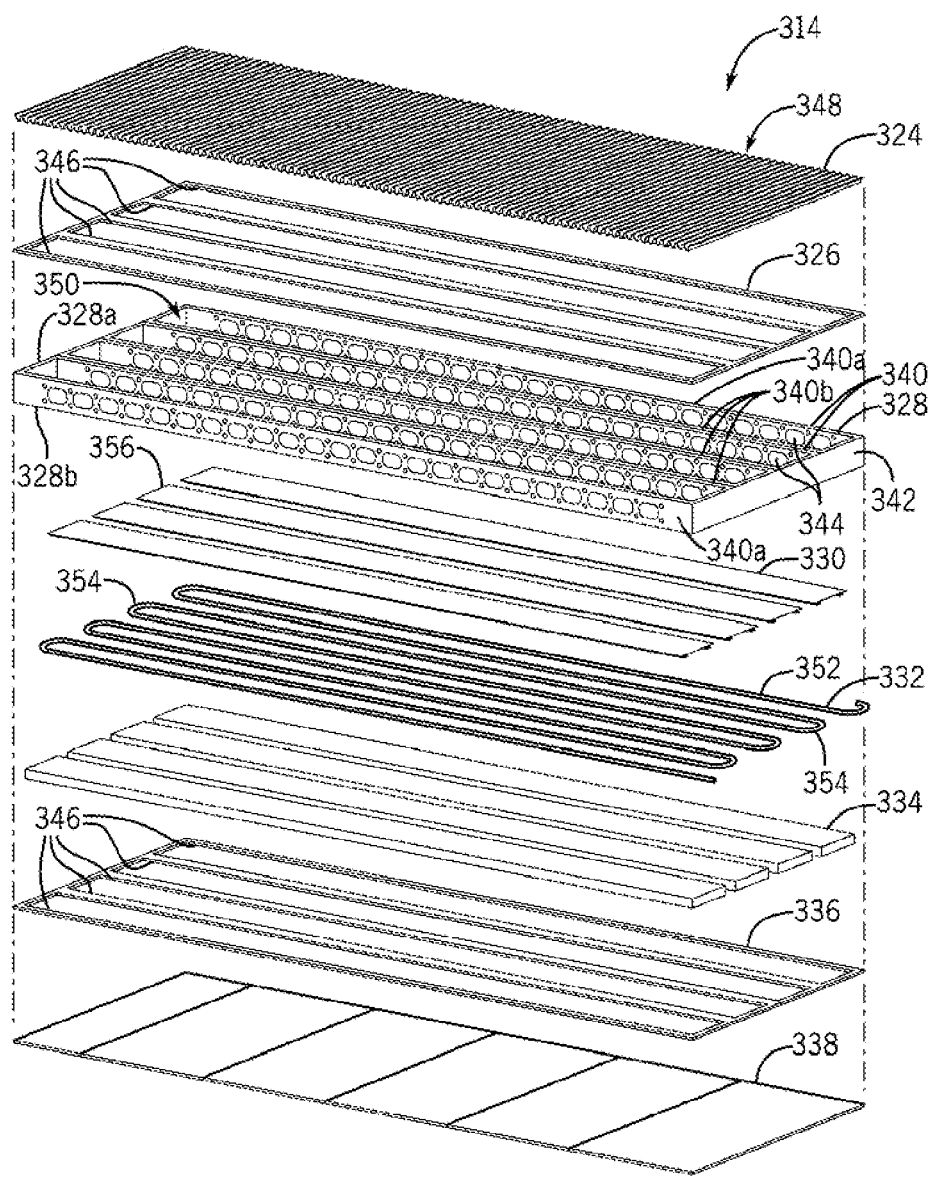
FIG. 3 is an exploded schematic illustration of an example floor and ceiling panel of the building of FIG. 1.

An exploded illustration of a floor and ceiling panel 314 in accordance with some embodiments is now shown (FIG. 3). FIG. 3 shows a corrugated form deck 324, a first sound dampener or dampener member 326, a frame 328, one or more holders or carriers 330, an in-floor radiant heat member 332, thermal insulation 334, a second sound dampener or dampener member 336, and a ceiling substrate 338. The corrugated form deck 324, first sound dampener 326, frame 328, one or more holders 330, in-floor radiant heat member 332, thermal insulation 334, second sound dampener 336, and ceiling substrate 338 may be pre-assembled to form the panel 314 prior to transport to the building site. A concrete topping slab may be formed on top of the corrugated form deck 324, which may be performed at the building site while the remainder of the panel 314 may be pre-fabricated and delivered to the building site. In some embodiments, one or more acoustical ceiling panels may be attached to the ceiling substrate 338. The various components shown in FIG. 3 are merely examples, and other variations, including eliminating components, combining components, and substituting components are all contemplated.

The frame 328 may include a plurality of joists 340 and opposing end members 342. The joists 340 may form supporting members that span the distance between the opposing end members 342 to support the floor of an upper unit and the ceiling of a lower unit. The joists 340 may be oriented generally perpendicular (e.g., plus or minus fifteen degrees) to the end members 342. The joists 340 may have apertures 344 extending transversely through the joists 340. In some embodiments, the joists 340 may be punched to form the apertures 344. In some embodiments, the frame 328 may be formed of metal, such as aluminum or steel, for fire resistance, structural strength, weight reduction, or other factors. In some embodiments, the frame 328 may be formed of a non-metallic material, such as wood or plastic.

The joists 340 may be spaced apart from one another at regular intervals along the length of the end members 342. In some embodiments, the joists 340 may be spaced at between about eight inch centers to about thirty-six inch centers along the length of the end members 342. In some embodiments, the joists 340 may be spaced at two foot centers along the length of the end members 342. The spacing of the joists 340 may be adjusted based on the load requirements of the panel 314. The number of joists 340 and end members 342 may be varied to suit the parameters of the particular building. In some embodiments, and as shown in FIG. 3, the frame 328 may include five joists 340 and two end members 342. The dimensions of the joists 340 and the end members 342 may be varied to suit the parameters of the particular building. In some embodiments, the frame 328 has a height of about ten inches, a width of about eight feet, and a length of about twenty-two feet. In some embodiments, the joists 340 have a height of about ten inches and a length of about twenty-two feet. In some embodiments, the end members 342 have a height of about ten inches and a length of about eight feet.

The joists 340 may include two or more outer joists 340a and one or more inner joists 340b positioned between the outer joists 340a. The outer joists 340a may be attached (e.g., machined, welded, bolted, or adhered) to the end members 342 to define an outer portion of the frame 328 and form a box frame. The inner joists 340b may extend generally parallel (e.g., plus or minus fifteen degrees) to the outer joists 340a. In some embodiments, the joists 340 may be formed of metal, such as aluminum or steel, for fire resistance, structural strength, weight reduction, or other factors. In some embodiments, the joists 340 may be formed of a non-metallic material, such as wood or plastic. In some embodiments, the joists 340 may be formed of lightweight steel and may be manufactured by Steelform Building Products Inc. (marketed under the name Mega Joist).

The first and second sound dampener 326, 336 may form a dual sound dampener system in each floor and ceiling panel 314. The first sound dampener 326 may be positioned along an upper side of the frame 328, and the second sound dampener 336 may be positioned along a lower side or underside of the frame 328. The first and second dampener 326, 336 may effectively mitigate floor impact and ambient noise sound transmission to meet building codes. The first and second sound dampener 326, 336 may be formed of various materials. In some embodiments, the first and second sound dampener 326, 336 may be formed of an elastomeric material, such as rubber. In some embodiments, the first and second sound dampener 326, 336 may be formed of recycled, ground-up rubber tires, rubber, foam padding, or other material with acoustic dampening properties.

The first and second sound dampener 326, 336 may be formed in elongate strips 346. The strips 346 may have a length corresponding to a length of an associated joist 340 or end member 342. The strips 346 may have a width corresponding to a width of an associated joist 340 or end member 342. In some embodiments, the strips 346 may be designed to match the footprint of the frame 328 and rest on top of the frame 328. In some embodiments, the strips 346 may be designed to extend beyond the frame 328 such that ends and/or edges of the strips 346 may extend over the top of the frame 328. In some embodiments, the strips 346 may be designed to be smaller than the footprint of the frame 328 such that a portion of the top of the frame is not covered by the strips 346. In some embodiments, the first and second sound dampener 326, 336 may extend along opposing upper and lower sides of each joist 340 and end member 342 of the frame 328. The thickness of the first and second sound dampener 326, 336 may be varied to suit the parameters of the building. In some embodiments, the first and second sound dampener 326, 336 may have a thickness between about one-eighth of an inch and about one inch. In some embodiments, the first and second sound s 326, 336 may have a thickness of about one-quarter of an inch.

The first sound dampener 326 may be abutted against an upper surface 328a of the frame 328. The first sound dampener 326 may be disposed between the corrugated form deck 324 and the frame 328. The first sound dampener 326 may space the corrugated form deck 324 apart from the frame 328 by the thickness of the first sound dampener 326. The first sound dampener 326 may include a plurality of strips of material 346 aligned with the joists 340, the end members 342, or both. In some embodiments, the strips of material 346 may extend along a majority of the length of each joist 340 and end member 342 of the floor and ceiling panel 314. In some embodiments, the strips of material 346 may extend along the entire length of each joist 340 and end member 342 of the floor and ceiling panel 314. The first sound dampener 326 may mitigate sound transmission between the corrugated form deck 324 and the frame 328.

The second sound dampener 336 may be abutted against a lower surface 328b of the frame 328. The second sound dampener 336 may be disposed between the ceiling substrate 338 and the frame 328. The second sound dampener 336 may space the ceiling substrate 338 apart from the frame 328 by the thickness of the second sound dampener 336. The second sound dampener 336 may include a plurality of strips of material 346 aligned with the joists 340, the end members 342, or both. In some embodiments, the strips of material 346 may extend substantially parallel along the length of each joist 340 and end member 342 of the floor and ceiling panel 314. In some embodiments, the strips of material 346 may extend along the entire length of each joist 340 and end member 342 of the floor and ceiling panel 314. The second sound dampener 336 may mitigate sound transmission between the ceiling substrate 338 and the frame 328.

The corrugated form deck 324 may be disposed above and attached to the frame 328, with the first sound dampener 326 positioned between the corrugated form deck 324 and the frame 328. In some embodiments, the corrugated form deck 324 may be disposed above and attached to the plurality of joists 340, the end members 342, or both. The corrugated form deck 324 may form a supporting substrate for a concrete topping slab. The corrugated form deck 324 may extend the entire length and width of the frame 328 to enclose an upper side of the floor and ceiling panel 314. The corrugated form deck 324 may define a plurality of alternating ridges and flutes 348. The flutes 348 may form recesses between adjacent ridges. While the corrugated pattern is shown roughly perpendicular to the long axis of the floor ceiling panel, the orientation of the corrugated pattern may be in any angle in relation to the long axis of the floor ceiling panel. In some embodiments, the corrugated form deck 324 may be formed of metal, such as aluminum or steel, or a non-metallic material, such as plastic. In some embodiments, the corrugated form deck 324 may be formed of galvanized steel. In some embodiments, the corrugated form deck 324 may be manufactured from G90 galvanized steel. In some embodiments, the corrugated form deck 324 may have a thickness between about 20 gauge and about 26 gauge. In some embodiments, the corrugated form deck 324 may be manufactured by Verco Decking, Inc. (marketed under the name Deep VERCOR™). In some embodiments, the corrugated form deck 324 may be a 1.5 inch corrugated steel form deck that is fastened, such as screwed, to the top of the frame 328 to form a sub-floor of an upper unit.

The in-floor radiant heat member 332 may be disposed between the corrugated form deck 324 and the ceiling substrate 338. In some embodiments, the in-floor radiant heat member 332 may be disposed below the corrugated form deck 324 within one or more bays or joist cavities 350 defined between adjacent joists 340. Between adjacent joists 340, the in-floor radiant heat member 332 may include one or more straight sections 352 extending parallel to the adjacent joists 340. The straight sections 352 may extend the majority of the length of the adjacent joists 340. In an embodiment, the in-floor radiant heat member 332 may include one or more transversely-extending sections 354 connecting the adjacent straight sections 352. The in-floor radiant heat member 332 may be a heat pipe, an electrical heating element, or other suitable heat member. In some embodiments, the in-floor radiant heat member 332 may be formed of hydronic radiant heat piping or tubing. In some embodiments, the in-floor radiant heat member 332 may be formed as a pipe or tube of cross-linked polyethylene, commonly referred to as PEX piping or tubing. The in-floor heating element may take on any shape or configuration so long as it is capable of distributing substantially throughout the panel 314. In some embodiments, electrical resistance may be used to cause the corrugated form deck to act as a heating element. In other embodiments, resistance heating may be used to cause the frame to act as the in-floor heating element.

The one or more holders 330 may be disposed between the corrugated form deck 324 and the ceiling substrate 338. The one or more holders 330 may be abutted against a lower side or underside of the corrugated form deck 324. In some embodiments, foam insulation may be introduced into the panel 314 below the corrugated form deck 324 and above the ceiling substrate 338. The one or more holders 330 may conceal or shield one or more flutes 348 of the corrugated form deck 324 to reduce migration of the foam insulation, for example, into the one or more flutes 348, which may otherwise block a portion of the heat transfer from the in-floor heat member 332 through the corrugated form deck 324 and a concrete topping slab. The one or more holders 330 may at least partially define a layer of material 356 sized to fit within a joist cavity 350 of the frame 328. The layer of material 356 may have similar length and width dimensions as the joist cavity 350, thereby concealing all of the flutes 348 of the corrugated form deck 324 between adjacent joists 340. The layer of material 356 may be thermally conductive and may be referred to as a heat-conductive or thermally-conductive material. In some embodiments, the layer of material 356 may be formed of metal, such as aluminum or steel.

The thermal insulation 334 may be disposed between the corrugated form deck 324 and the ceiling substrate 338. The thermal insulation 334 may be disposed beneath the layer of material 356 in the joist cavities 350 of the frame 328. In some embodiments, the thermal insulation 334 may be spray foam insulation, such as a closed-cell spray foam insulation. The thermal insulation 334 may have a depth that is less than the distance between the layer of material 356 and the ceiling substrate 338 so as to define a cavity or space between the thermal insulation 334 and the ceiling substrate 338. Fire sprinkler piping, electrical wiring, data cabling, or plumbing may extend through the cavity. In some embodiments, the thermal insulation 334 may have a depth of about two inches to about eight inches. In some embodiments, the thermal insulation 334 may have a depth of about four inches and may define a space of about six inches. In some embodiments, the thermal insulation 334 may be a closed-cell spray foam manufactured by Icynene Inc.

The ceiling substrate 338 may be attached to the frame 328, with the second sound dampener 336 positioned between the frame 328 and the ceiling substrate 338. The ceiling substrate 338 may be formed with various dimensions depending on the building application. The ceiling substrate 338 may be disposed below and attached to the plurality of joists 340. The ceiling substrate 338 may extend the entire length and width of the frame 328 to enclose a lower side of the floor and ceiling panel 314. The ceiling substrate 338 may have a width of about four feet and a length of about eight feet. The ceiling substrate 338 may have a thickness of between about one-quarter of an inch and about one inch. In some embodiments, the ceiling substrate 338 may have a thickness of about three-quarters of an inch. The ceiling substrate 338 may be secured to the frame 328 with fasteners, for example, after assembly of the frame 328, the corrugated form deck 324, the one or more holders 330, the in-floor radiant heat member 332, the thermal insulation 334, and the sound isolation members 326, 336. Acoustical ceiling panels may be disposed below the ceiling substrate 338 to finish the ceiling of a portion of a story in a building below the panel. The ceiling substrate 338 may be a non-combustible material such as a non-combustible cement and cellulose fiber board. In some embodiments, the ceiling substrate 338 may be formed of a sheet of magnesium oxide board and a sheet of fiber board. In some embodiments, the ceiling substrate 338 may be formed of one sheet of twelve millimeter magnesium oxide board and one sheet of eleven millimeter fiber board. In some embodiments, the fiber board may be a non-combustible, structural fiber cement board manufactured by US Architectural Products (marketed under the name Plycem® CemDeck™).

A concrete topping slab may be disposed above the corrugated form deck 324. The concrete topping slab may form a lightweight concrete finished floor of a unit disposed above the floor and ceiling panel 314. The concrete topping slab may be formed on top of the corrugated form deck 324 to create the building diaphragm, transferring lateral loads to the external frame of the building. The concrete topping slab may be formed on top of the pre-assembled floor and ceiling panel 314 at the building site. The concrete topping slab may include an integral color compound mixed in to the concrete for aesthetics. The concrete topping slab may be troweled to form the finished floor of a building unit. After the concrete topping slab is cured, a sealer may be applied to the slab. The concrete topping slab may span an entire floor of the building in some embodiments. Accordingly, a number of floor and ceiling panels may be used to define a floor of the building, and a singly concrete topping slab may be formed and supported by the collection of floor and ceiling panels.

Figure 4:
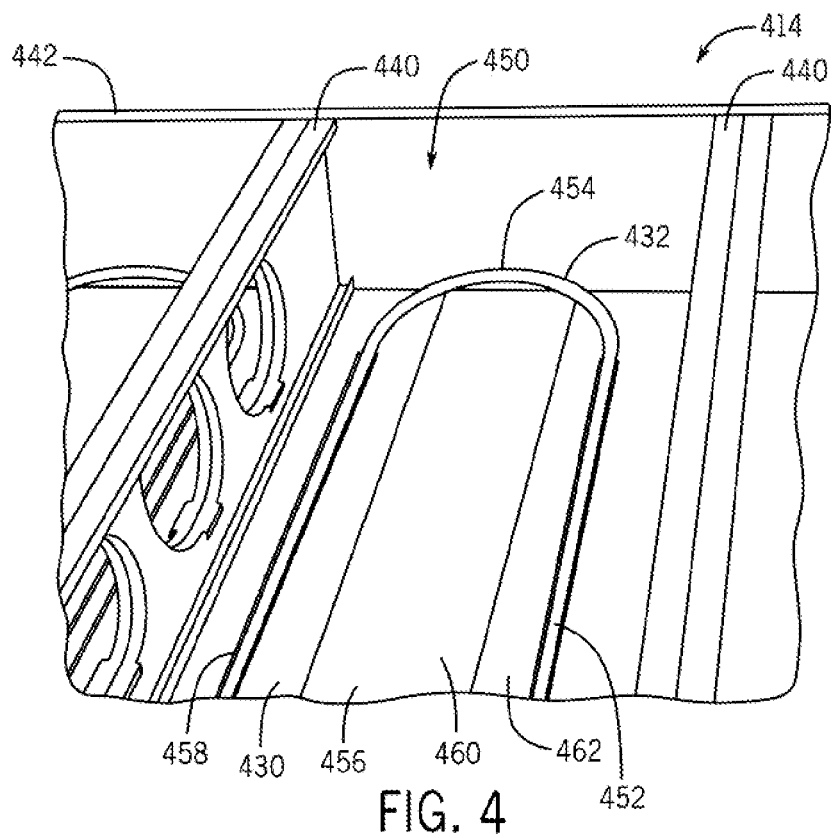
FIG. 4 is a fragmentary schematic illustration of an inverted example floor and ceiling panel of the building of FIG. 1 illustrating an in-floor radiant heat member extending lengthwise along and transversely between adjacent joists.

FIG. 4 provides a close-up illustration of an inverted example floor and ceiling panel 414 in accordance with at least some embodiments. FIG. 4 illustrates the floor and ceiling panel in a position inverted from how the floor and ceiling panel may typically be used. That is, the reader is looking from the ceiling portion of the panel through the interior of the panel to the floor portion of the panel. FIG. 4 shows a portion of the in-floor radiant heat member 432, a holder 430, and joists 440. The various components described in FIG. 4 are merely examples, and other variations, including eliminating components, combining components, and substituting components are all contemplated.

As shown in FIG. 4, a portion of the in-floor radiant heat member 432 may be disposed between adjacent joists 440 of the floor and ceiling panel 414. The in-floor radiant heat member 432 may be attached to an underside of the corrugated form deck 424. The in-floor radiant heat member 432 may be formed as a continuous loop and may be secured to the corrugated form deck 424 by one or more holders 430 positioned beneath the corrugated form deck 424 between the adjacent joists 440. The holders 430 may secure one or more straight sections 452 of the radiant heat member 432 to the corrugated form deck 424, and a transversely-extending section 454 of the radiant heat member 432 may extend between the ends of the straight sections 452.

A layer of thermally-conductive material 456 may be disposed between a retention feature 458 of the holders 430 and the corrugated form deck 424 to distribute the heat from the radiant heat member 432 to the corrugated form deck 424. The layer of material 456 may include a sheet of material 460, flanges 462 of the holders 430, or both. The sheet of material 460 may be disposed between the flanges 462 of the holders 430 and may cover the flutes 448 of the corrugated form deck 424 exposed between the holders 430. The sheet of material 460 may be attached to the underside of the corrugated form deck 424, to the holders 430, or both. The sheet of material 460 and the flanges 462 may form a barrier in each bay or joist cavity 450 and may prevent the intrusion of insulation, such as closed-cell spray foam insulation, into the flutes 448 of the corrugated form deck 424 between the in-floor radiant heat member 432 and the corrugated form deck 424. The layer of material 456 may provide uniform radiant heat transfer from the radiant heat member 432 through the corrugated form deck 424 and into the concrete topping slab, which may function as the floor of a story in a building above the concrete topping slab. In some embodiments, the sheet of material 460 and the flanges 462 may be constructed as a single, continuous piece of material and may define a unitary layer of material 456. The holders 430, the sheet of material 460, or both may be formed of any thermally-conductive material, such as metals like aluminum or steel, wood or plastic.

Figure 5:
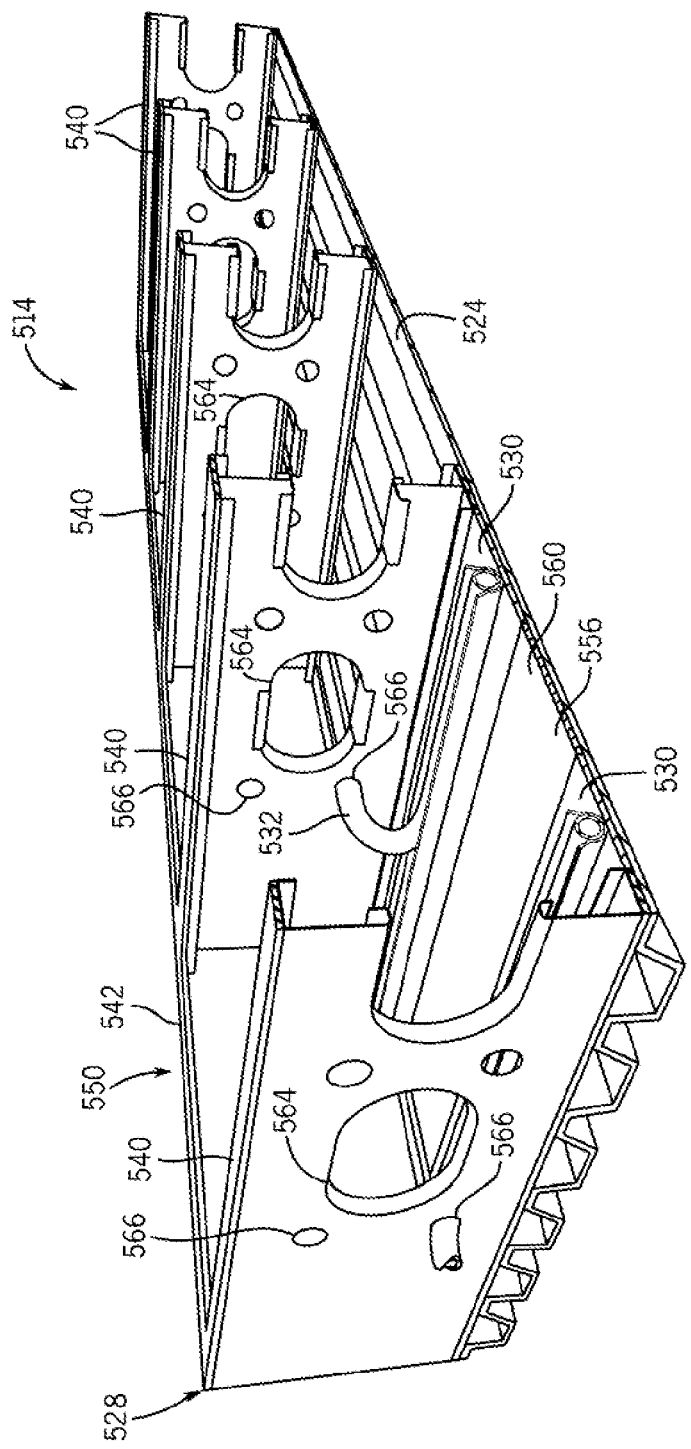
FIG. 5 is a fragmentary schematic illustration of an inverted example floor and ceiling panel of the building of FIG. 1 illustrating an in-floor radiant heat member extending transversely through a joist.

FIG. 5 illustrates a floor and ceiling panel in a position inverted from how the floor and ceiling panel may typically be used. That is, the floor portion of the panel is facing down. An in-floor radiant heat member 532 is now shown in a floor and ceiling panel 514 according to some embodiment (FIG. 5). The in-floor radiant heat member 532 may extend transversely through a joist 540, arranged in accordance with at least some embodiments described herein. The various components described in FIG. 5 are merely examples, and other variations, including eliminating components, combining components, and substituting components are all contemplated.

One or more of the joists 540 of the frame may define a plurality of apertures extending transversely through the one or more joists 540. The apertures may include a first set of apertures 564 aligned along a centerline of the joists 540 and spaced along the length of the joists 540. Additionally or alternatively, the apertures may include a second set of apertures 566 offset from a centerline of the joists 540 and spaced along the length of the joists 540 between adjacent apertures of the first set of apertures 564. The first set of apertures 564 may include oval-shaped apertures, and the second set of apertures 566 may include circular-shaped apertures. The first set of apertures 564 may be larger in size than the second set of apertures 566.

To extend into adjacent joist cavities 550, the radiant heat member 532 may extend through one or more apertures 566 defined in the joists 540. As shown in FIG. 5, the radiant heat member 532 may extend through an aperture of the second set of apertures 566 that is spaced from the underside of the corrugated form deck 524 by less than one-third of the height of the joist 540. The aperture 566 may have an inner dimension, such as an inner diameter, that matches an outer dimension, such as an outer diameter, of the radiant heat member 532. Although not shown, a grommet may be received within the aperture 566 and may internally receive the radiant heat member 532 to prevent wear on the radiant heat member 532 from the joist 540. As shown in FIG. 5, the radiant heat member 532 may extend transversely through the inner joists 540 and extend lengthwise along the joists 540 within the joist cavities 550. The radiant heat member 532 may extend transversely through an aperture formed in an outer joist 540 into an adjacent floor and ceiling panel so that the radiant heat member 532 may extend continuously through one or more floor and ceiling panels 514 of a unit 112 of the building 102.

The radiant heat member 532 may be attached to one or more holders 530 to secure the radiant heat member 532 to the corrugated form deck 524. The holders 530 may be positioned longitudinally along the length of the joist cavity 550 between adjacent joists 540. The holders 530 may be attached, for example adhered or welded, to an underside of the corrugated form deck 524. A sheet of material 560 may be positioned between the holders 530 within the joist cavity 550 and extend along the length of the joist cavity 550. The holder 530 and the sheet of material 560 may form a layer of material 556 covering the corrugated form deck 524. In some embodiments, the holders 530 and the sheet of material 560 may be formed as a single member.

Figure 6:
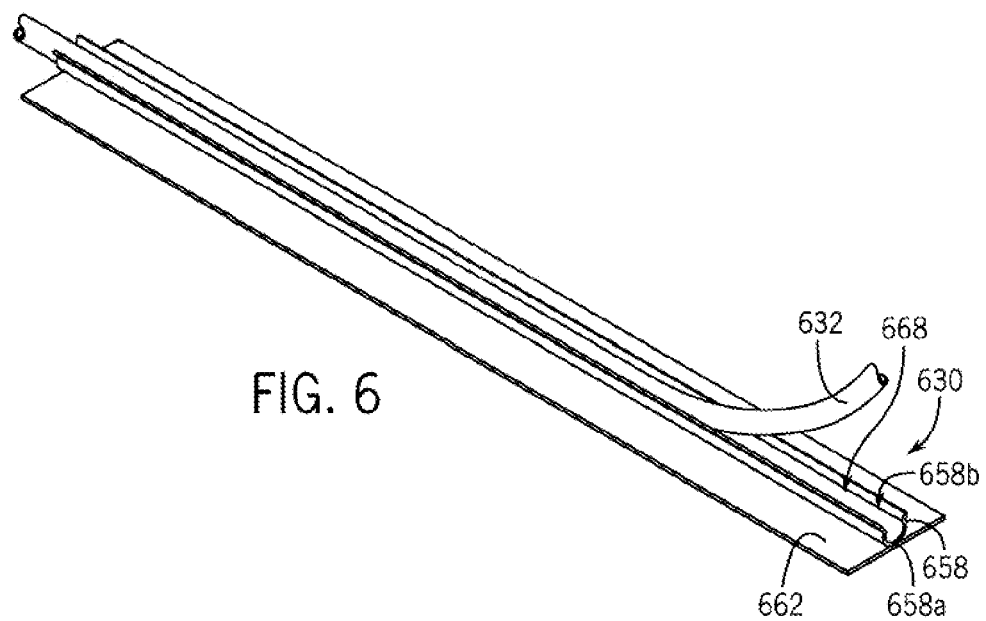
FIG. 6 is a schematic illustration of an example in-floor radiant heat member and a holder of the floor and ceiling panel of FIG. 5.

FIG. 6 illustrates an embodiment of an in-floor radiant heat member 632 and holder 630 of the floor and ceiling panel. The radiant heat member 632 may be partially placed within the holder 630. The holder 630 may be attached to an underside of a corrugated form deck. The various components described in FIG. 6 are merely examples, and other variations, including eliminating components, combining components, and substituting components are all contemplated.

The radiant heat member 632 may be pressed into a longitudinally-extending recess 668 to secure the radiant heat member 632 in place. The holders 630 may include a flange 662 on one or both sides of the retention feature 658. The flange 662 may be formed as a thin, elongate plate and may have a rectangular shape. The retention feature 658 may be generally U-shaped having a closed side 658a attached to the holder 630 and an open side 658b opposite the closed side 658a configured to receive the radiant heat member 632. The holders 630 may be oriented such that the flange 662 is disposed between the corrugated form deck 624 and the retention feature 658. The recess 668 of the retention feature 658 may open in a downwardly direction. During insertion of the radiant heat member 632 into a holder 630, the retention feature 658 may resiliently deform until the radiant heat member 632 snaps into the recess 668 of the holder 630, where the radiant heat member 632 may be secured in place by the retention feature 658. The holder 630 may be formed of a thermally-conductive material, such as aluminum or steel, to transfer heat from the radiant heat member 632 to the corrugated form deck 624 and into the concrete topping slab. The holder 630 may be formed as an extrusion.

Figure 7:
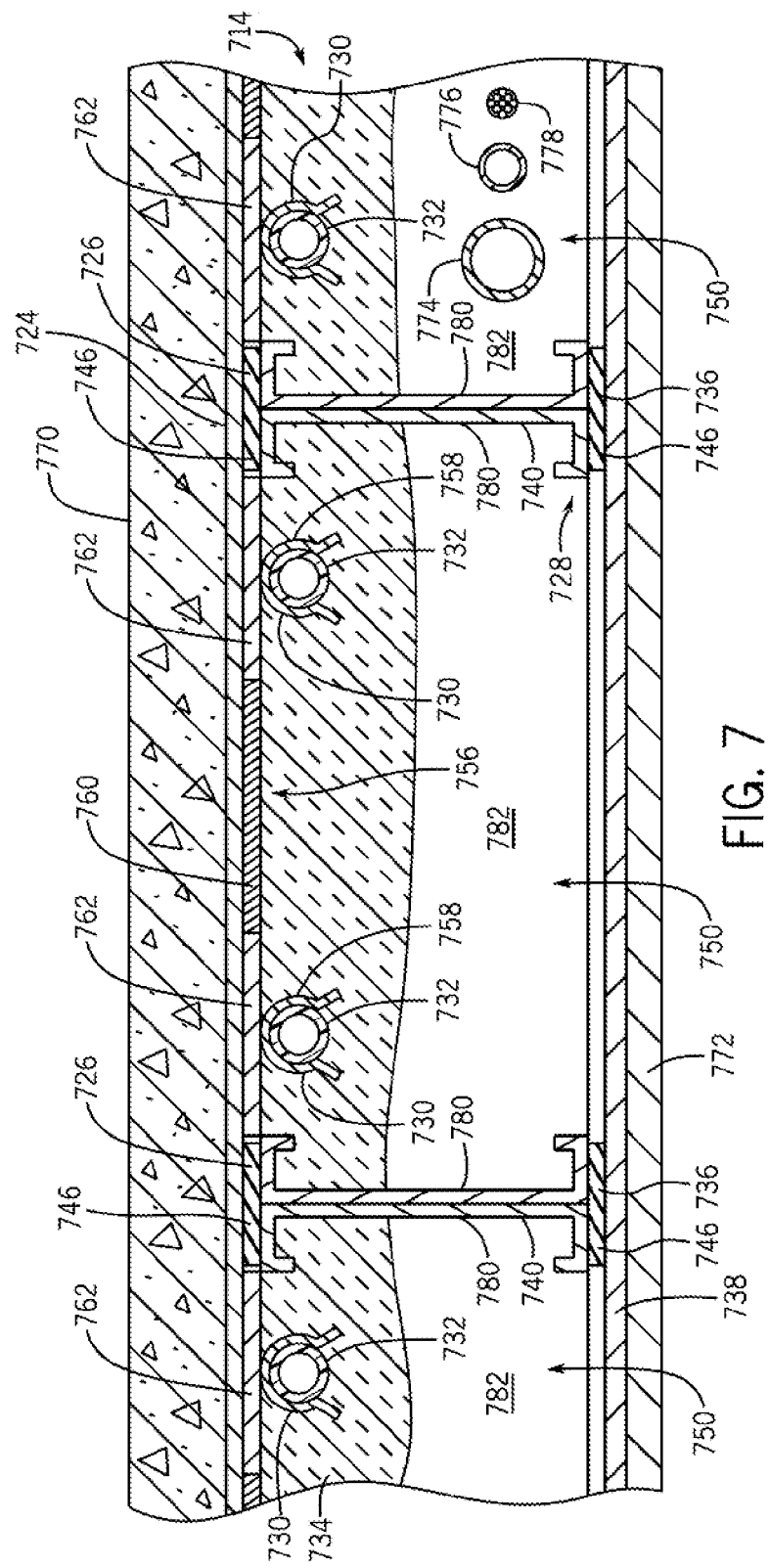
FIG. 7 is a fragmentary, schematic illustration of a cross-section of an example floor and ceiling panel of the building of FIG. 1.

FIG. 7 provides a cross-section of a floor and ceiling panel 714 according to an embodiment. A concrete topping slab 770 may be poured over a corrugated form deck 724 once the floor and ceiling panel 714 is properly installed. The floor and ceiling panel 714 may contain first and second sound dampeners 726, 736, one or more holders 730, one or more radiant heat member(s) 732, a sheet of material 760, thermal insulation 734, a ceiling substrate 738, one or more acoustical ceiling panels 772, joists 740, plumbing 774, sprinkler piping 776, and electrical cabling or wiring 778. The various components described in FIG. 7 are merely examples, and other variations, including eliminating components, combining components, and substituting components are all contemplated.

The concrete topping slab 770 may be formed on top of the corrugated form deck 724 at the building site. In some embodiments, the concrete topping slab 770 may be placed (e.g., poured) on top of the corrugated form deck 724 after installation of the pre-assembled floor and ceiling panel 714 at the building site. The concrete topping slab 770 may create the structural diaphragm for the building 102. The concrete topping slab 770 may have a thickness suitable for the building 102. In some embodiments, the concrete topping slab 770 may have a thickness of between about one inch and about twelve inches. In some embodiments, the concrete topping slab 770 may have a thickness of about three inches. The concrete topping slab 770 may form the finished floor of a unit positioned directly above the floor and ceiling panel 714.

The one or more acoustical ceiling panels 772 may be positioned along a lower side or underside of the ceiling substrate 738 at the building site. In some embodiments, the acoustical ceiling panels 772 may be attached to the ceiling substrate 738 after installation of the pre-assembled floor and ceiling panel 714 at the building site. In some embodiments, the acoustical ceiling panels 772 may be attached to the ceiling substrate 738 with hook and loop fasteners. The acoustical ceiling panels 772 may form the finished ceiling of a unit positioned directly below the floor and ceiling panel 714. The acoustical ceiling panels 772 may have seams between adjacent panels that are offset from seams of the ceiling substrate 738. In some embodiments, the one or more acoustical ceiling panels 772 may be made from one-hundred percent polyester and may be manufactured by Acoustical Solutions (marketed under the name PolyPhon™ Polyester Acoustical Panels).

The first and second sound dampeners 726, 736 may be positioned along opposing upper and lower sides of the frame 728 to mitigate sound transmission between upper and lower adjacent units. The first sound dampener 726 may be positioned between a deck 724 and the joists 740. The second sound dampener 736 may be positioned between the ceiling substrate 738 and the joists 740. The first and second sound dampeners 726, 736 may be formed as elongate strips of material 746 extending along the length of the joists 740.

The joists 740 may extend vertically between the first and second sound dampeners 726, 736. One or more of the inner joists 740 may be I-shaped and may extend between opposing end members. The joists 740 may be attached (e.g., machined, welded, bolted, or adhered) to the end members. One or more of the joists 740 may be formed of two C-shaped members 780 attached back-to-back. In some embodiments, one or more of the inner joists 740 may be formed of two members 780 fastened back-to-back. The C-shaped members may be stitch welded, bolted, screwed or fastened together in any suitable manner. In some embodiments, one or more of the joists 740 may be formed of I-beams.

The holders 730 may be attached to the corrugated form deck 724. The holders 730 may include a flange or base plate 762 disposed in the same plane as the first sound dampener 726. Each joist cavity 750 of the frame 728 may include one or more holders 730. The central joist cavity 750 may include one, two, or more holders 730 positioned alongside the joists 740. The retention feature 758 of the holders 730 may extend downwardly from the flange 762. The retention feature 758 may be attached to the base of the holder, such as by adhesive, welding, or another suitable attachment method. The radiant heat member 732 may be held in the holder 730 due to an interference fit. The retention feature 758 may resiliently deform upon insertion of the radiant heat member 732 into the retention feature 758.

The thermal insulation 734 may be disposed between the corrugated form deck 724 and the ceiling substrate 738. The thermal insulation 734 may be prevented from ingress into the flutes of the corrugated form deck 724 by the layer of material 756. The sheet of material 760 and the flanges 762 may form the layer of material 756. The thermal insulation 734 may be spaced apart from the ceiling substrate 738 to define a cavity or space 782 between the thermal insulation 734 and the ceiling substrate 738. The thermal insulation 734 may surround all but an upper side of the retention features 758 of the holders 730 to restrict the heat from the radiant heat member 732 from radiating laterally or downwardly toward a lower unit 112. The thermal insulation 734 may direct the heat from the radiant heat member 732 upwardly toward the concrete topping slab or floor 770. The heat from the radiant heat member 732 may be transferred to the concrete topping slab 770 via the layer of material 756 and the corrugated form deck 724. The thermal insulation 734 may be placed (e.g., sprayed) into the joist cavity 750 after attachment of the corrugated form deck 724 to the frame 728, the holders 730 to the corrugated form deck 724, and the sheet of material 760 to the corrugated form deck 724.

Plumbing 774, sprinkler piping 776, electrical cabling or wiring 778, or any combination thereof may be disposed in a cavity or space 782 defined within the floor and ceiling panel 714 between the thermal insulation 734 and the ceiling substrate 738. The plumbing pipes 774, sprinkler piping 776, and electrical cabling or wiring 778 may be positioned below the thermal insulation 734 and above the ceiling substrate 738. After installation of the plumbing pipes 774, sprinkler piping 776, electrical cabling or wiring 778, or any combination thereof, the ceiling substrate 738 may be installed to enclose a lower side of the floor and ceiling panel 714.

Figure 8:
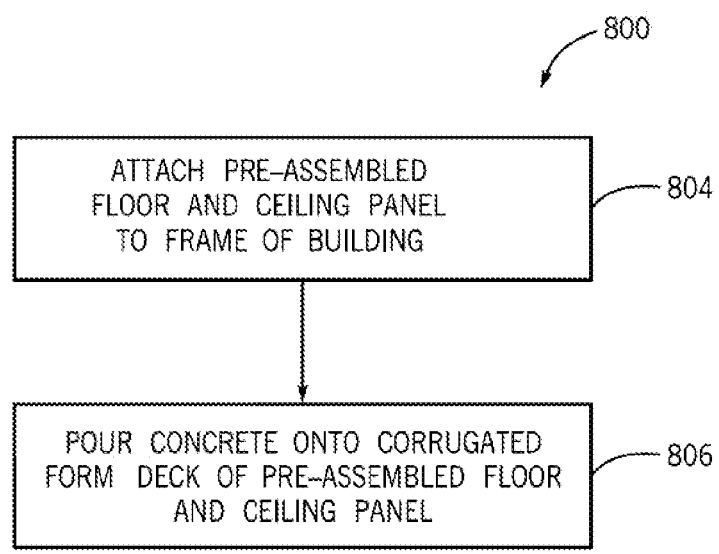
FIG. 8 is a flowchart illustrating an example method of constructing a floor system for a building.

FIG. 8 illustrates a flowchart illustrating an example method of constructing a floor system for a building, arranged in accordance with at least some embodiments described herein. Block 804 recites "attach pre-assembled floor and ceiling panel to frame of building", and block 806 recites "pour concrete onto corrugated form deck of pre-assembled floor and ceiling panel." For example, the method 800 of FIG. 8 may be implemented using the floor and ceiling panel, external frame, and building shown in the preceding Figures. Recall the pre-assembled panel may include a plurality of joists, a corrugated form deck disposed above and attached to the plurality of joists, a ceiling substrate disposed below and attached to the plurality of joists, and an in-floor radiant heat member disposed between the corrugated form deck and the ceiling substrate. The radiant heat member may be separated from the concrete by the corrugated form deck.

The blocks included in the described example methods are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

In block 804, the floor and ceiling panel may be attached to the frame of a building. For example, the floor and ceiling panel may be attached to an exterior metal structure, which may provide the structural support for a building. Generally, any mechanism may be used to attach the floor and ceiling panel, or multiple floor and ceiling panels, to the frame of the building, such as an external metal structure. Any type of fastening may generally be used.

In block 806, concrete may be poured onto the floor and ceiling panel. As described herein, pouring the concrete may form a diaphragm of the building, which may span an entire story of the building in some embodiments. In this manner, the concrete may be poured at the completed height of the story of the building, after the floor and ceiling panels had been positioned at the desired story, thereby forming the floor of units in that story.

Example 1

In a first non-limiting example, a floor and ceiling panel may include a frame, a floor substrate, and a ceiling substrate. The frame may be made of metal, such as aluminum or steel. Alternatively the frame may be made of wood. The floor substrate may be a corrugated form deck made from metal, such as aluminum or steel, and may be attached to the frame along an upper side of the frame. The ceiling substrate may be made from fiber-cement board and may be attached to the frame along a lower side of the frame. A heat pipe may be routed through one or more joist cavities defined by the panel and may be attached to a lower side of the corrugated form deck. The heat pipe may be made from plastic, such as cross-linked polyethylene. Sound isolation material may be positioned between the frame and the corrugated form deck and between the frame and the ceiling substrate. The sound isolation material may be made from an elastomeric material, such as rubber. A three-inch layer of concrete may be poured on top of the corrugated form deck so that the heat pipe is separated from the concrete by the corrugated form deck. Spray foam insulation, such as closed-cell spray foam insulation, may be sprayed into the one or more joist cavities beneath the heat pipe to mitigate heat radiation in a downwardly direction toward the ceiling substrate.

Example 2

In a second non-limiting example, a floor and ceiling panel may include a frame, a floor substrate, and a ceiling substrate. The frame may be made from wood or wood-based products like WPC. The floor substrate may be made from wood and may be attached to the frame along an upper side of the frame. The ceiling substrate may be made from wood and may be attached to the frame along a lower side of the frame. A heat member, such as a heat pipe or an electrical heating element, may be routed through one or more joist cavities defined by the panel and may be attached to a lower side of the floor substrate. Sound isolation material may be positioned between the frame and the floor substrate and between the frame and the ceiling substrate. The sound isolation material may be formed of a vibration damping material, such as an elastomer. A flooring material (such as wood, a moldable or pourable material, a tile, or concrete) may be placed on top of the floor substrate to form a finished floor surface. Insulation may be placed into the one or more joist cavities between the heat member and the ceiling substrate to mitigate heat radiation in a downwardly direction toward the ceiling substrate.

Example 3

In a third example, a floor and ceiling panel may include a frame, a floor substrate, and a ceiling substrate. The frame may be formed of a fiber-reinforced composite material. The floor substrate may be formed of fiber-cement board and may be attached to the frame along an upper side of the frame. The ceiling substrate may be formed of fiber-cement board and may be attached to the frame along a lower side of the frame. A heat member, such as a fluidic heat pipe or an electrical heating element, may be routed through one or more joist cavities defined by the panel and may be attached to a lower side of the floor substrate. Sound isolation material may be positioned between the frame and the floor substrate and between the frame and the ceiling substrate. The sound isolation material may be formed of a commercially-available vibration damping material, such as an elastomer. A layer of moldable or pourable material (such as concrete) may be formed on top of the floor substrate. Insulation may be placed in the one or more joist cavities around the heat member to mitigate heat radiation in a downwardly direction toward the ceiling substrate.

The examples provided are for explanatory purposes only and should not be considered to limit the scope of the disclosure. Embodiments of pre-assembled floor and ceiling panels described herein, including the pre-assembled floor and ceiling panel 114, may provide a floor and ceiling system useable in low-rise, mid-rise, and high-rise residential projects, among others. The panels may be configured to comply with one or more of the following building codes: fire, energy, handicap, life-safety, and acoustical (impact and ambient noise transfer). In some embodiments, the pre-assembled floor and ceiling panels may be considered as a fully-integrated sub-assembly meeting fire, sound impact, energy, and life/safety codes. The floor and ceiling panels may be fully integrated with electrical, fire protection, energy insulation, and sound isolation capabilities in some embodiments. The floor and ceiling panels may be designed to achieve a fire rating set by the applicable building code, such as a two-hour fire rating. In some embodiments, the panels may provide a heating system for the building units, such as the units 112 in FIG. 1.

The floor and ceiling panels described herein may be fabricated off-site in a factory or shop and transported to the project jobsite for attachment to a structural frame, such as a structural exoskeleton, of a building. The panels may be fabricated in various sizes, such as eight feet by twenty-two feet. Smaller infill panels may be prefabricated on a project-by-project basis to complete the building floor system. At the building site, the panel may be attached to end walls, demising walls, utility walls, building utilities, or any combination thereof. The floor and ceiling panel may provide support the overall floor system, which may include a concrete topping slab poured in the field to create a structural diaphragm for the building.

The floor and ceiling panel may provide a floor substrate and a ceiling substrate. A frame, such as a light gauge frame, may support the floor substrate. In some embodiments, the floor substrate is a corrugated form deck, and a lightweight concrete finished floor is formed on top of the corrugated form deck. Opposite the floor substrate the frame may support a ceiling substrate, such as a fiber-cement board. An in-floor radiant heat member, sound and energy insulation, sound dampeners for acoustically separating floors, fire sprinkler piping, electrical wiring and data cabling, or any combination thereof may be positioned between the floor and ceiling substrates.

The present disclosure is not to be limited in terms of the particular embodiments described in this application, which are intended as illustrations of various aspects. Many modifications and embodiments can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and embodiments are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various embodiments of the devices and/or processes via the use of block diagrams, flowcharts, and/or embodiments, such block diagrams, flowcharts, and/or embodiments contain one or more functions and/or operations, it will be understood by those within the art that each function and/or operation within such block diagrams, flowcharts, or embodiments can be implemented, individually and/or collectively, by a wide range of hardware, software, firmware, or virtually any combination thereof.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific embodiments of operably couplable include but are not limited to physically mateable and/or physically interacting components and/or wirelessly interactable and/or wirelessly interacting components and/or logically interacting and/or logically interactable components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A pre-assembled floor and ceiling panel for use in a building, the panel comprising:
   a plurality of parallel joists, including a first outer joist at a first side of the panel, a second outer joist at a second side of the panel opposite to the first side of the panel, and a third inner joist positioned between the first outer joist and the second outer joist;
   a corrugated form deck disposed above and attached to the plurality of parallel joists;
   a ceiling substrate disposed below and attached to the plurality of parallel joists;
   an in-floor radiant heat member disposed between the corrugated form deck and the ceiling substrate, wherein:
     the in-floor radiant heat member extends transversely through a first aperture formed transversely through the first outer joist so as to extend the in-floor radiant heat member to a first panel that is adjacent to the panel at the first side,
     the in-floor radiant heat member extends transversely through a second aperture that is formed transversely through the second outer joist so as to extend the in-floor radiant heat member to a second panel that is adjacent to the panel at the second side,
     the in-floor radiant heat member extends transversely through a third aperture that is formed transversely through the third inner joist so that the in-floor radiant heat member extends continuously between two joist cavities defined at least in part by the third inner joist, and the pre-assembled floor and ceiling panel is configured to comply with a two-hour fire rating;

thermal insulation disposed between the corrugated form deck and the ceiling substrate; and a layer of material disposed below and attached to an underside of the corrugated form deck and disposed as a separate layer above the thermal insulation, wherein the layer of material covers flutes of the corrugated form deck to restrict upward migration of the thermal insulation into the flutes, wherein the layer of material comprises a plurality of layer pieces each having similar length and width dimensions as a corresponding joist cavity defined by two adjacent joists so as to conceal all flutes of the corrugated form deck between the two adjacent joists, wherein the layer of material is thermally conductive, and wherein the in-floor radiant heat member is disposed below and attached to the layer of material to enable the layer of material to receive and conduct heat from the in-floor radiant heat member and such that the layer of material provides uniform radiant heat transfer from the in-floor radiant heat member to the underside of the corrugated form deck and through the corrugated form deck.

2. The panel of claim 1, further comprising a sound dampener disposed between the corrugated form deck and the plurality of parallel joists.

3. The panel of claim 1, further comprising a sound dampener disposed between the ceiling substrate and the plurality of parallel joists.

4. The panel of claim 1, wherein:
the thermal insulation has a depth that is less than the distance between the layer of material and the ceiling substrate so as to define a cavity between the thermal insulation and the ceiling substrate, and
the panel further comprises plumbing, sprinkler piping, or electrical wiring disposed in the cavity defined between the thermal insulation and the ceiling substrate.

5. The panel of claim 1, wherein the in-floor radiant heat member comprises heat piping.

6. The panel of claim 1, wherein the in-floor radiant heat member comprises an electrical heating element.

7. The panel of claim 1, further comprising a floor material disposed above the corrugated form deck and which receives heat transferred from the corrugated form deck, wherein the floor material comprises concrete.

8. A panel for use in a building, the panel comprising:
a plurality of parallel joists, including a first outer joist at a first side of the panel, a second outer joist at a second side of the panel opposite to the first side of the panel, and a third inner joist positioned between the first outer joist and the second outer joist, wherein the third inner joist is formed of two C-shaped members attached back-to-back;
a corrugated form deck disposed above and attached to the plurality of parallel joists;
a ceiling substrate disposed below and attached to the plurality of parallel joists;
a sound dampener disposed between the corrugated form deck and the plurality of parallel joists;
an in-floor radiant heat member that is positioned by at least one holder within joist cavities defined by the plurality of parallel joists, wherein:
the at least one holder is thermally conductive and includes a retention feature that resiliently deforms to define an opening to receive the in-floor radiant heat member and reforms to secure the in-floor radiant heat member,
the in-floor radiant heat member extends transversely through a first aperture formed transversely through the first outer joist so as to extend the in-floor radiant heat member to a first panel that is adjacent to the panel at the first side,
the in-floor radiant heat member extends transversely through a second aperture that is formed transversely through the second outer joist so as to extend the in-floor radiant heat member to a second panel that is adjacent to the panel at the second side, and
the in-floor radiant heat member extends transversely through a third aperture that is formed transversely through the third inner joist so that the in-floor radiant heat member extends continuously between two joist cavities defined at least in part by the third inner joist;

thermal insulation disposed below the in-floor radiant heat member and disposed between the corrugated form deck and a ceiling substrate; and a layer of material disposed below and attached to an underside of the corrugated form deck and disposed as a separate layer above the thermal insulation, wherein the layer of material covers flutes of the corrugated form deck to restrict upward migration of the thermal insulation into the flutes, wherein the layer of material comprises a plurality of layer pieces each having similar length and width dimensions as a corresponding joist cavity defined by two adjacent joists so as to conceal all flutes of the corrugated form deck between the two adjacent joists, and wherein the layer of material is thermally conductive, and wherein the in-floor radiant heat member is disposed below and attached to the layer of material by the at least one holder to enable the layer of material to receive and conduct heat from the in-floor radiant heat member and such that the layer of material provides uniform radiant heat transfer from the in-floor radiant heat member to the underside of the corrugated form deck, through the corrugated form deck, and into a floor material disposed above the corrugated form deck.

9. The panel of claim 8, wherein the sound dampener comprises a plurality of strips of material aligned with the plurality of parallel joists.

10. The panel of claim 8, further comprising another sound dampener disposed between the ceiling substrate and the plurality of parallel joists.

11. A method to construct a floor system for a building, the method comprising:
attaching a first pre-assembled panel to a frame of the building, wherein the first pre-assembled panel comprises:
a panel frame that includes a first plurality of parallel joists and opposing end members, wherein the first plurality of parallel joists form supporting members that span a distance between the opposing end members, and wherein the first plurality of parallel joists include a first joist at a first side of the first pre-assembled panel, a second joist at a second side of the first pre-assembled panel opposite to the first side of the first pre-assembled panel, and a third joist positioned between the first joist and the second joist;

a first corrugated form deck disposed above and attached to the first plurality of parallel joists;

a first ceiling substrate disposed below and attached to the first plurality of parallel joists;

an in-floor radiant heat member disposed between the first corrugated form deck and the first ceiling substrate, wherein:

one or more joists of the first plurality of parallel joists define a plurality of apertures that extend transversely through the one or more joists, the plurality of apertures include a first set of apertures aligned along a centerline of the one or more joists and spaced along the length of the one or more joists, and a second set of apertures offset from the centerline of the one or more joists and spaced along the length of the one or more joists between adjacent apertures of the first set of apertures, and the in-floor radiant heat member extends through one or more apertures, of the second set of apertures, formed in the third joist, into pre-assembled panels that are adjacent to the first pre-assembled panel, wherein the pre-assembled panels include a first adjacent pre-assembled panel at the first side, and a second adjacent pre-assembled panel at the second side;

thermal insulation disposed between the first corrugated form deck and the first ceiling substrate; and a layer of material disposed below and attached to an underside of the first corrugated form deck and disposed as a separate layer above the thermal insulation, wherein the layer of material covers flutes of the first corrugated form deck to restrict upward migration of the thermal insulation into the flutes, wherein the layer of material comprises a plurality of layer pieces each having similar length and width dimensions as a corresponding joist cavity defined by two adjacent joists so as to conceal all flutes of the first corrugated form deck between the two adjacent joists, and wherein the layer of material is thermally conductive, and wherein the in-floor radiant heat member is disposed below and attached to the layer of material to enable the layer of material to receive and conduct heat from the in-floor radiant heat member and such that the layer of material provides uniform radiant heat transfer from the in-floor radiant heat member to the underside of the first corrugated form deck and through the first corrugated form deck; and placing floor material onto the first corrugated form deck, wherein the in-floor radiant heat member is separated from the floor material by the first corrugated form deck.

12. The method of claim 11, further comprising:

attaching the first adjacent pre-assembled panel and the second adjacent pre-assembled panel to the frame of the building, wherein at least one of the first adjacent pre-assembled panel and the second adjacent pre-assembled panel comprises: a second plurality of parallel joists, a second corrugated form deck disposed above and attached to the second plurality of parallel joists, and a second ceiling substrate disposed below and attached to the second plurality of parallel joists; and attaching the first pre-assembled panel, the first adjacent pre-assembled panel, and the second adjacent pre-assembled panel together with a strip of material to cover a seam between the panels.

13. The method of claim 11, wherein the first pre-assembled panel complies with a two-hour fire rating.

14. The method of claim 11, wherein the thermal insulation has a depth that is less than the distance between the layer of material and the first ceiling substrate so as to define a cavity between the thermal insulation and the first ceiling substrate.

15. The method of claim 11, wherein the third joist is formed of two C-shaped members attached back-to-back.

16. The panel of claim 1, wherein the third inner joist is formed of two C-shaped members attached back-to-back.

17. The panel of claim 1, wherein:

one or more joists of the plurality of parallel joists define a plurality of apertures that extend transversely through the one or more joists, the plurality of apertures include a first set of apertures aligned along a centerline of the one or more joists and spaced along the length of the one or more joists, and a second set of apertures offset from the centerline of the one or more joists and spaced along the length of the one or more joists between adjacent apertures of the first set of apertures, and the second set of apertures include the first aperture, the second aperture, and the third aperture, through which the in-floor radiant heat member extends transversely.

18. The panel of claim 8, wherein the panel is configured to comply with a two-hour fire rating.

19. The panel of claim 8, wherein:

one or more joists of the plurality of parallel joists define a plurality of apertures that extend transversely through the one or more joists, the plurality of apertures include a first set of apertures aligned along a centerline of the one or more joists and spaced along the length of the one or more joists, and a second set of apertures offset from the centerline of the one or more joists and spaced along the length of the one or more joists between adjacent apertures of the first set of apertures, and the second set of apertures include the first aperture, the second aperture, and the third aperture, through which the in-floor radiant heat member extends transversely.

20. The panel of claim 8, wherein the thermal insulation has a depth that is less than the distance between the layer of material and the ceiling substrate so as to define a cavity between the thermal insulation and the ceiling substrate.

* * * * *